US010735798B2

(12) United States Patent
Lennon et al.

(10) Patent No.: US 10,735,798 B2
(45) Date of Patent: *Aug. 4, 2020

(54) VIDEO BROADCAST SYSTEM AND A METHOD OF DISSEMINATING VIDEO CONTENT

(71) Applicants: Helen Bradley Lennon, County Down (GB); Damien Purcell, County Louth (IE)

(72) Inventors: Helen Bradley Lennon, County Down (GB); Damien Purcell, County Louth (IE)

(73) Assignee: HELEN BRADLEY LENNON (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,887

(22) Filed: Apr. 12, 2019

(65) Prior Publication Data

US 2019/0238919 A1 Aug. 1, 2019

Related U.S. Application Data

(63) Continuation of application No. 15/037,237, filed as application No. PCT/EP2014/074884 on Nov. 18, 2014, now Pat. No. 10,313,729.

(30) Foreign Application Priority Data

Nov. 18, 2013 (GB) .................................. 1320343.5

(51) Int. Cl.
*H04N 21/81* (2011.01)
*H04N 21/274* (2011.01)
(Continued)

(52) U.S. Cl.
CPC ... *H04N 21/2743* (2013.01); *H04N 21/41407* (2013.01); *H04N 21/44004* (2013.01);
(Continued)

(58) Field of Classification Search
CPC ....................... H04N 21/8126; H04N 21/8146
See application file for complete search history.

(56) References Cited

U.S. PATENT DOCUMENTS 6,473,136 B1 10/2002 Hasegawa et al.
6,573,907 B1 6/2003 Madrane
(Continued)

FOREIGN PATENT DOCUMENTS

EP 0596732 A1 5/1994
EP 1737221 A1 12/2006
(Continued)

OTHER PUBLICATIONS

Combined Search and Examination Report for Application No. GB1320343.5 dated Apr. 22, 2014.
(Continued)

*Primary Examiner* — Brian T Pendleton
*Assistant Examiner* — Frank Johnson
(74) *Attorney, Agent, or Firm* — Tarolli, Sundheim, Covell & Tummino LLP

(57) ABSTRACT

A method and system for distributing video content across a distributed network is described. The system comprises a first device having video data provided thereon. A first application is operable on the first device and is configured for associating control data with the video data, wherein the control data contains information for creating auxiliary data which is to be presented with the video data subsequent to the video data being broadcast to one or more second devices across the network. A control centre is in communication with the first application for receiving the video data and the associated control data from the first device. The control centre is operable to broadcast the video data and the associated control data to one or more second devices. A media player is provided on the respective second (Continued)

devices which is operable in response to reading the control data to create the auxiliary data on the respective second device. The media player is operable to launch the auxiliary data while the media player is playing the video data.

22 Claims, 20 Drawing Sheets

(51) Int. Cl.
*H04N 21/2743* (2011.01)
*H04N 21/414* (2011.01)
*H04N 21/44* (2011.01)
*H04N 21/458* (2011.01)
*H04N 21/6543* (2011.01)
*H04N 21/6547* (2011.01)

(52) U.S. Cl.
CPC ....... *H04N 21/458* (2013.01); *H04N 21/6543* (2013.01); *H04N 21/6547* (2013.01); *H04N 21/8126* (2013.01); *H04N 21/8146* (2013.01); *H04N 21/8153* (2013.01)

(56) References Cited

U.S. PATENT DOCUMENTS

| | | |
|---|---|---|
| 7,788,690 B2 | 8/2010 | Ito et al. |
| 7,792,190 B2 | 9/2010 | Watanabe et al. |
| 8,612,450 B1 | 12/2013 | Proffit et al. |
| 8,736,761 B2 | 5/2014 | Kendall et al. |
| 9,602,850 B2 | 3/2017 | Qian et al. |
| 2001/0050685 A1* | 12/2001 | Simons ............. G06T 13/00 345/475 |
| 2002/0013943 A1* | 1/2002 | Haberman ........... G11B 27/031 725/39 |
| 2002/0157105 A1 | 10/2002 | Vienneau et al. |
| 2003/0033157 A1 | 2/2003 | Dempski et al. |
| 2003/0167467 A1 | 9/2003 | Allen et al. |
| 2004/0003402 A1 | 1/2004 | McKenna |
| 2004/0078814 A1 | 4/2004 | Allen |
| 2004/0103120 A1 | 5/2004 | Fickle et al. |
| 2004/0261128 A1 | 12/2004 | Fahy et al. |
| 2007/0118619 A1 | 5/2007 | Schwesig et al. |
| 2008/0256169 A1 | 10/2008 | Oehm |
| 2009/0094637 A1 | 4/2009 | Lemmons |
| 2009/0106442 A1 | 4/2009 | Liu |
| 2009/0115901 A1 | 5/2009 | Winter et al. |
| 2009/0222754 A1 | 9/2009 | Phillips et al. |
| 2009/0310020 A1 | 12/2009 | Vrijsen |
| 2009/0317065 A1 | 12/2009 | Fyock |
| 2010/0050083 A1 | 2/2010 | Axen et al. |
| 2011/0078324 A1 | 3/2011 | Honma et al. |
| 2011/0276881 A1 | 11/2011 | Keng et al. |
| 2012/0117632 A1 | 5/2012 | Curtis et al. |
| 2012/0167134 A1 | 6/2012 | Hendricks et al. |
| 2013/0031582 A1 | 1/2013 | Tinsman et al. |
| 2013/0097634 A1 | 4/2013 | Jin et al. |
| 2013/0198794 A1* | 8/2013 | Dharmapurikar ....... H04L 65/80 725/118 |
| 2014/0150013 A1 | 5/2014 | Fauqueur et al. |
| 2014/0282690 A1 | 9/2014 | Keohane et al. |
| 2015/0071613 A1 | 3/2015 | Dharssi et al. |
| 2015/0181002 A1* | 6/2015 | Lee ................. H04L 67/42 709/203 |
| 2016/0165282 A1* | 6/2016 | Yuan ................. G06T 1/20 725/116 |
| 2017/0127098 A1 | 5/2017 | Barsoba et al. |

FOREIGN PATENT DOCUMENTS

| | | |
|---|---|---|
| JP | 2000175167 A | 6/2000 |
| JP | 2005130356 A | 5/2005 |

OTHER PUBLICATIONS

Written Opinion for Application No. PCT/EP2014/074884.
International Search Report for Application No. PCT/EP2014/074884 dated Mar. 6, 2015.

* cited by examiner

SEAMLESS BROADCAST - META SEGMENTS OPENERS, BUMPERS AND STINGS

Local-Live editing with Realtime Live Stream Layering

Capture share

VIDEO BROADCAST SYSTEM AND A METHOD OF DISSEMINATING VIDEO CONTENT

RELATED APPLICATIONS

The present invention is a U.S. Continuation patent application, claiming priority to U.S. Ser. No. 15/037,237, filed on 17 May 2016; which is a National Phase 371 filing of PCT/EP2014/074884, filed on 18 Nov. 2014; which claims priority to UK 1320343.5, filed on 18 Nov. 2013, the entirety of both of which are incorporated herein by reference.

FIELD OF THE INVENTION

The present teaching relates to a video broadcast system and a method of disseminating video content. In particular, the present teaching is directed to a system and method for broadcasting video content across a network along with control data specifying effects which are to be applied to the video content in real-time as the video is being played.

BACKGROUND

Video broadcast has become more prevalent in recent years with the delivery of video and digital content to smart devices becoming even more widespread. On smart devices, video is currently viewed using a wide variety of applications, either via a locally installed application on the smart device itself or directly via the internet. However, these existing video broadcast systems have demonstrated various shortcomings when used in conjunction with viewing videos containing high quality graphics and special effects on smart devices. For instance, in order for a video to have high quality graphics and special effects, the video file must be in a suitably high quality resolution. The downloading of this sizable high resolution video to view on a smart device often causes the video to stutter or stop playback where the rate of playback has exceeded the rate at which the video is being downloaded. In addition, as this high resolution video content has a large volume, its storage and transmission costs are a consideration, even with the data being compressed for both storage and upload/download. In other instances, lesser quality video is created for viewing on smart devices which does not require a lot of buffering; however, in this case the video resolution is reduced and therefore the resolution of the graphics and special effects incorporated into the single video file are of a diminished quality.

There is therefore a need for a video broadcast system and a method of disseminating video content which addresses at least some of the drawbacks of the prior art.

SUMMARY

In one aspect there is provided a method for distributing video content across a network; the method comprising:
providing video data on a first device,
associating control data with the video data on the first device; wherein the control data contains information for creating auxiliary data,
broadcasting the video data and control data to one or more second devices across the network,
providing a media player on the respective second devices which is operable in response to reading the control data to create the auxiliary data locally on the respective second devices, and
launching the auxiliary data while the media player is playing the video data.

In another aspect, the control data comprises machine executable instructions encapsulated by tags. Advantageously, the control data comprises meta data. In one example, the control data comprises machine readable markup language.

In a further aspect, the auxiliary data comprises at least one display segment. Advantageously, the auxiliary data comprises a plurality of display segments.

In one aspect, the media player performs a calculation to determine buffering time required for the video data to be downloaded to the respective second devices.

In another aspect, the calculated buffering time is incorporated into the control data received by the respective second devices.

In one aspect, the video data comprises at least one video section. Advantageously, the control data comprises machine readable instructions detailing how the at least one display segment is to be displayed with respect to the at least one video section.

In a further aspect, the period for displaying the at least one display segment is determined by the buffering time incorporated into the control data. Advantageously, the period for displaying the at least one display segment is proportional to the buffering time incorporated into the control data. In one example, the period for displaying the at least one display segment is associated with the buffering time incorporated into the control data such that the at least one display segment and the at least one video section are displayed sequentially without a time delay interruption there between.

In another aspect, the control data comprises machine readable instructions detailing how a plurality of display segments are to be displayed with respect to a plurality of video sections.

In one aspect, the combined period for displaying a plurality of display segments is set by the buffering time. In another example, the period for displaying at least one display segment is varied in response to the calculated buffering time. In one arrangement, the period for displaying two or more display segments are varied in response to the calculated buffering time.

In a further aspect, each video section corresponds to a particular video selected by the user on the first device.

In one aspect, the media player on the respective second devices is operable in response to reading the control data to initiate a fetch process for retrieving data. In one example, the data which is fetched is stored locally on the second device. In another example, the data which is fetched is at a location remote of the second device. In an exemplary arrangement, the fetched data contains computer readable instructions. Advantageously, the computer readable instructions include instructions to implement a specified effect. In one example, the fetched data is pre-stored on the second device. In an alternative example, the fetched data is used to creatre a specified effect.

In another aspect, a first database is provided on the first device for storing the control data.

In one aspect, a second database is provided on the respective second device for storing data elements which are referenced in the control data.

In another aspect, the control data includes instructions for applying at least one specified effect, a graphic, text data, a special effect, or audio data to the video data when the video data is being played on the media player on the respective second devices.

In a further aspect, a first user interface is provided on the first device for facilitating a user selecting the control data to be associated with the video data.

In one aspect, the control data associated with the video data is synchronised with the video data on the first device. Advantageously, a data structure is generated on the first device containing the video data and the associated control data. In one example, the control data associated with the video data is synchronised with the video data on a second device with synced video data from the first device.

In another aspect, the first device is configured to transmit the data structure to a control centre. Advantageously, the control centre is configured for communicating the data structure to the one or more second devices.

In one aspect, the control centre is operable for modifying the control data associated with the video data. Advantageously, the control centre is operable to approve or disapprove the video data in advance of broadcasting.

In another aspect, the media player is configured to read the data structure. Advantageously, a remote device is in communication with the control centre for facilitating remote approval of the video data and associated control data.

In one arrangement, the control data comprises one or more tags for facilitating searching by a search engine.

In a further aspect, the control data comprises a plurality of control parameters which represent corresponding effects.

In one aspect, one or more of the control parameters are selectable on the first device.

In a further aspect, the selected one or more control parameters on the first device are associated with the video data such that the one or more control parameters are applied by the media player as it is being played on the respective second devices.

In one aspect, the video data is captured on the first device using an in-built camera.

In another aspect, the video data is received at the first device via a network.

In one arrangement, wherein the media player is configured to create and layer specified effects linked to the control data onto the video data.

In a further aspect, wherein the control centre is configured to provide a user profile for each second device.

In one aspect, the control centre is operable to modify the control data associated with the video data for delivery to a particular second device based on the user profile.

In a further aspect, a template is provided on the first device for facilitating the placing of a video subject within a template.

In one aspect, the network bandwidth of the respective second devices are monitored such that a video resolution is selected for broadcasting based upon the available network bandwidth.

The present disclosure also relates to a system for distributing video content; the system comprising:
 a first device having video data provided thereon,
 a first application operable on the first device and being configured for associating control data with the video data, wherein the control data contains information for creating auxiliary data which is to be presented with the video data subsequent to the video data being broadcast to one or more second devices across the network;
 a control centre in communication with the first application for receiving the video data and the associated control data from the first device, the control centre being operable to broadcast the video data and the associated control data to one or more second devices, and a media player being provided on the respective second devices which is operable in response to reading the control data to create the auxiliary data on the respective second device; the media player being operable to launch the auxiliary data while the media player is playing the video data.

The present disclosure also relates to a media player operable for playing video data on a portable device, the player comprising:
 a means for receiving video data and associated control data,
 a means for reading the control data,
 a means for creating auxiliary data on the portable device based on the control data, and
 a means for launching the auxiliary data while the video data is playing.

Additionally, the present disclosure relates to a computer readable medium comprising a data carrier having encoded thereon machine readable instructions which, when executed in a computerised system implements a method for distributing video content across a network; the method comprising:
 providing video data on a first device,
 associating control data with the video data on the first device; wherein the control data contains information for creating auxiliary data,
 broadcasting the video data and control data to one or more second devices across the network,
 providing a media player on the respective second devices which is operable in response to reading the control data to create the auxiliary data locally on the respective second devices, and
 launching the auxiliary data while the media player is playing the video data.

In one aspect there is provided a method for distributing video content across a distributed network; the method comprising:
 providing video data on a first device,
 associating control data with the video data on the first device for specifying effects to be applied to the video data subsequent to the video data being broadcast to one or more second devices across the network,
 providing a media player on the respective second devices which is operable in response to reading the control to initiate a fetch process.

In one aspect, a template is provided on the first device. Advantageously, the template contains a designated minimal resolution area where the video data is inserted. In one example the minimal resolution area is layered with the video data. Advantageously, the video data has a lower resolution than the auxiliary data. In one example, the auxiliary data has a high definition (HD) resolution. In another example, the video data has a standard definition (SD) video resolution.

In one aspect, the majority of the visual display on the second device is occupied by the auxiliary data while the video data occupies a relatively small portion of the visual display on the second device thereby providing an overall visual impression that the output from the media player is of HD resolution.

In an exemplary arrangement, the video data is inserted into an area of the auxiliary data such that the auxiliary data and the video appear integrated.

In another aspect, the network bandwidth of the respective second devices are monitored such that a video resolution is selected for broadcasting based upon the available network bandwidth. Advantageously, video that is subject to a lower bandwidth will be displayed with bandwidth restrictions applied within a video broadcast. Advantageously, the layered specified effects are not subject to bandwidth issues and as a result remain at full HD resolution. Advantageously, a full frame broadcast under bandwidth restrictions may reduce the quality of the video but the percentage of frame that is of HD quality remains greater than the bandwidth restriction applied.

These and other features will be better understood with reference to the followings Figures which are provided to assist in an understanding of the present teaching.

BRIEF DESCRIPTION OF THE DRAWINGS

The present teaching will now be described with reference to the accompanying drawings in which.

DETAILED DESCRIPTION OF THE DRAWINGS

The present teaching will now be described with reference to an exemplary video broadcast system. It will be understood that the exemplary broadcast system is provided to assist in an understanding of the present teaching and is not to be construed as limiting in any fashion. Furthermore, modules or elements that are described with reference to any one Figure may be interchanged with those of other Figures or other equivalent elements without departing from the spirit of the present teaching.

Figure 1:
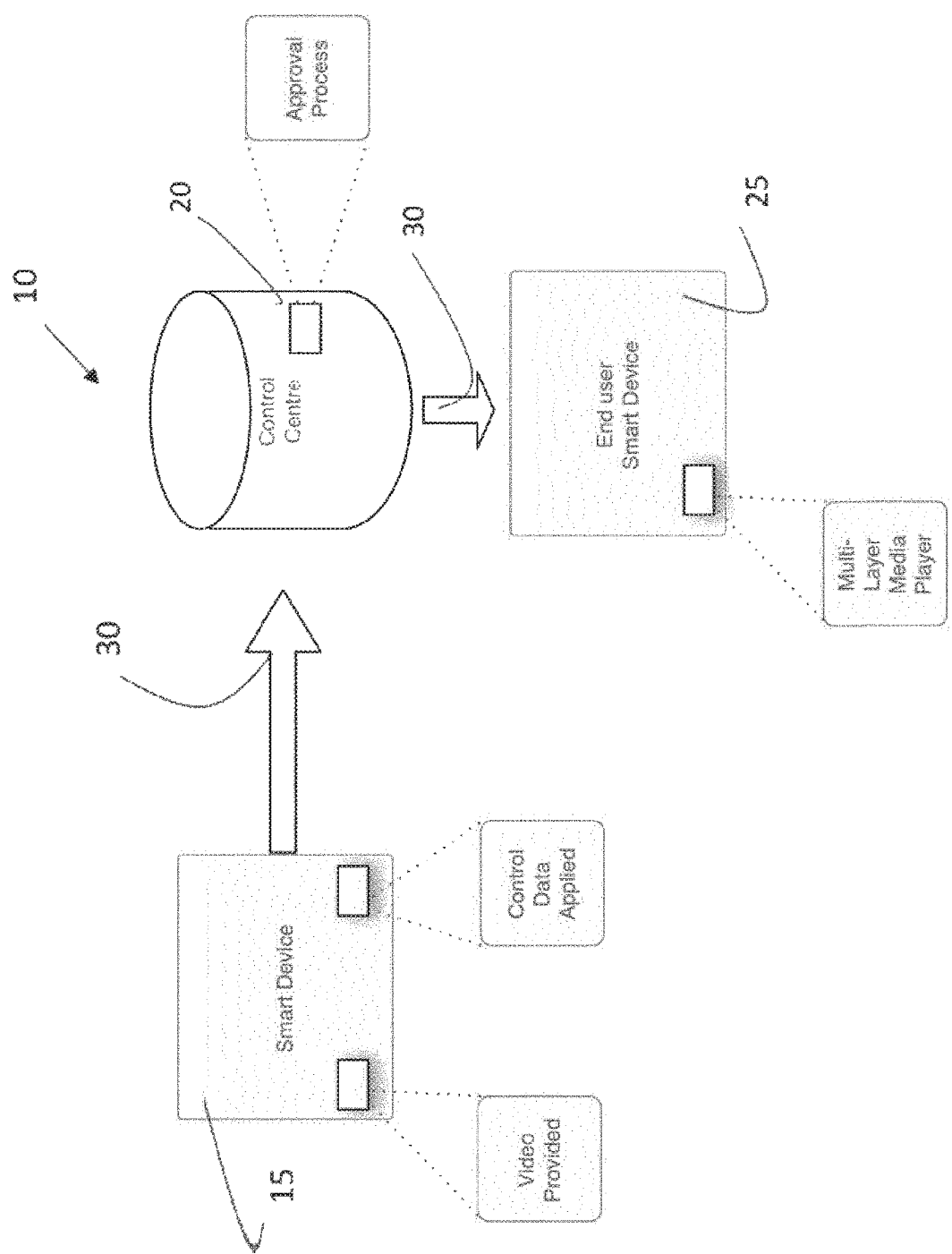
FIG. 1 is a block diagram of a system for distributing video content across a distributed network in accordance with the present teaching.

Referring initially to FIG. 1, there is provided a video broadcast system 10 which facilitates individual users to create videos on portable handheld devices such as a tablet 15, and then send the video to a control centre 20, via a network 30, from which other users can download to their tablets 25 or similar handheld devices. The user who creates the video on the tablet 15 are able to add auxiliary data such as effects to the captured video but when the data is being transmitted across a network 30 only the raw video data is sent together with some control information in the form of metadata. The auxiliary data which are added by the user on the tablet 15 may include, for example, graphics, customisable text overlays, special effects, audio, etc. When the video is downloaded to the tablets 25 the auxiliary data/ specified effects which are linked to the metadata are recreated assembled and built by the mediaplayer on the tablets 25. The specified effects are then overlaid onto the video on the tablets 25 giving the appearance of a flattened single high quality video file. It will therefore be appreciated that the specified effects are applied to the video after the tablets 25 have downloaded the video from the control centre 20. Therefore when a user downloads a video created by another using the video broadcast system 10, the downloaded raw video data is accompanied by the appropriate control information in the form of metadata, which controls a media player on the tablets 25 to play the video together with the creator's intended special effects. In this way the volume of data transmitted across the network 30 is reduced.

Traditionally, the specified effects/auxiliary data would have been applied in advance of the video being transmitted from the creator by fundamentally altering the raw video data by inserting graphics and special effects through editing and rendering thereby creating a single flattened video file. This single flattened video file containing the high quality graphics and special effects would then be transmitted across the network requiring a relatively high band width. Alternatively this single flattened video file may be compressed/ transcoded for transmission across the network; however, this compression/transcoding results in increased pixalation due to a reduction of the data size and results in lower quality graphics and special effects. The current broadcast system, due to its multilayering methodologies, allows the video data to be compressed/transcoded allowing for more rapid transmission across the network. However, the graphics and special effects are applied post broadcasting as they are created, built and assembled on the smart devices via the multi layer media player thereby maintaining a higher quality under lower bandwidth availability than the traditional method described above.

Figure 2:
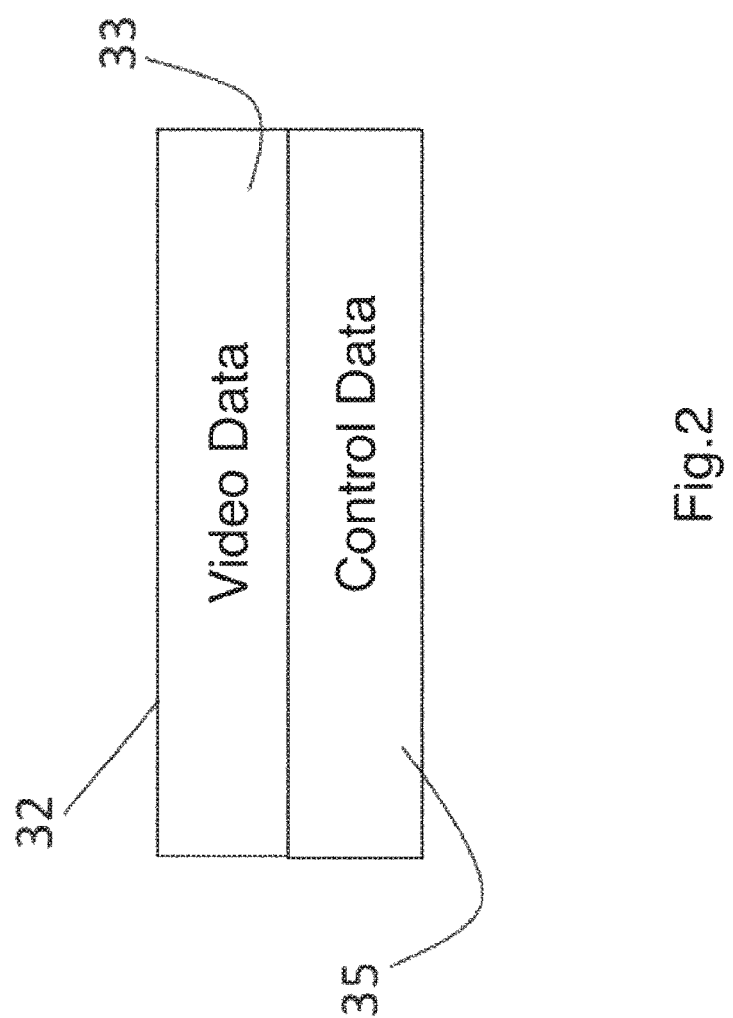
FIG. 2 is a graphical representation of a data structure which is broadcast using the system of FIG. 1.
Figure 3:
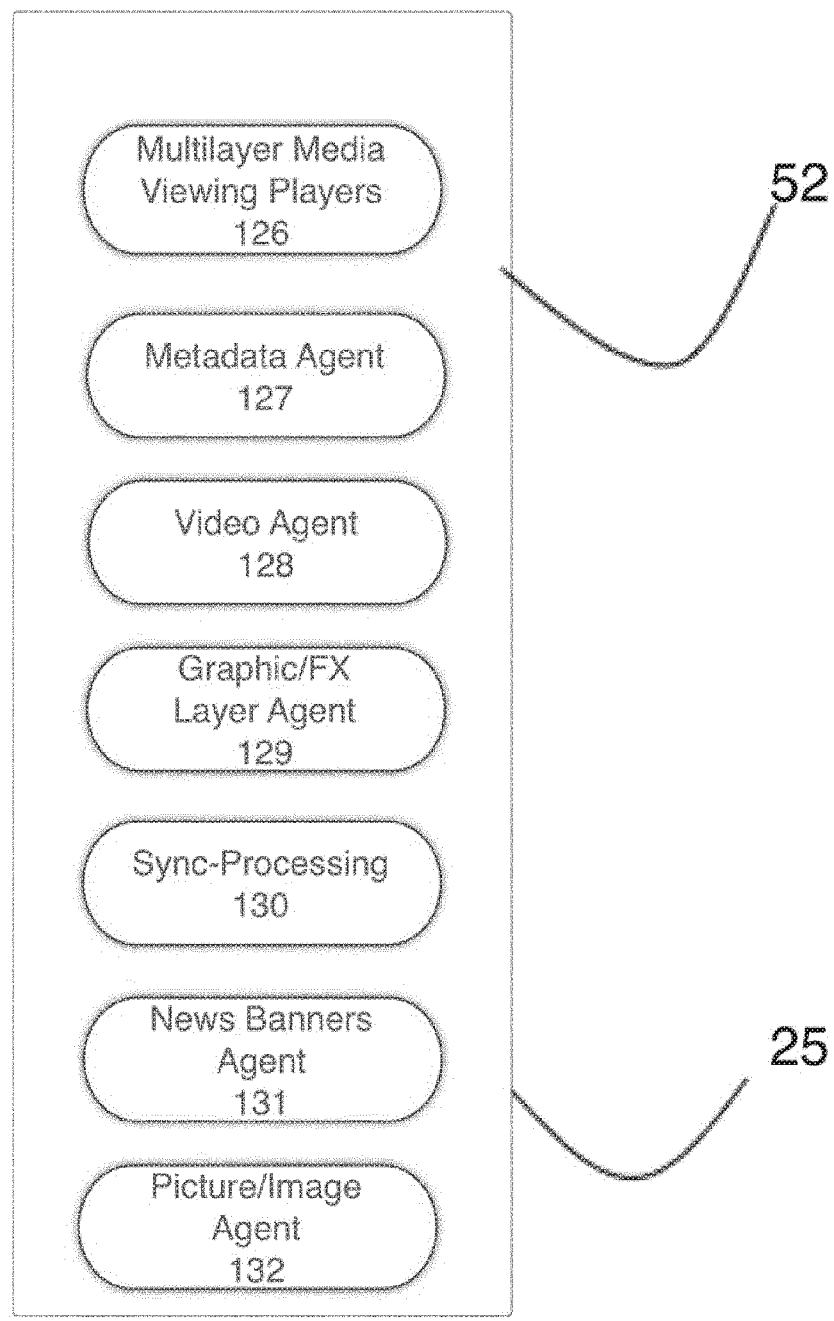
FIG. 3 is a diagrammatic representation of a software application which is operable to read the data structure of FIG. 2.
Figure 4A:
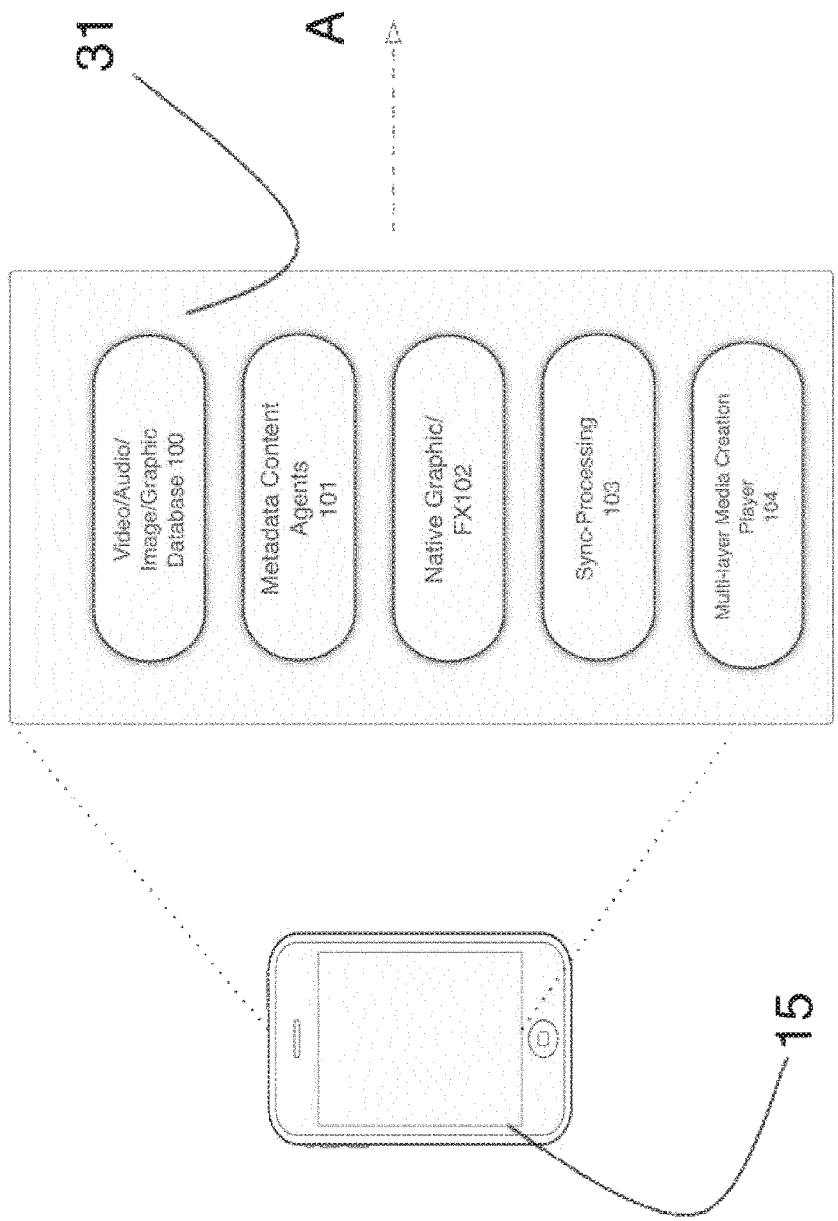
FIG. 4A is a diagrammatic representation of another software application which is operable to generate the data structure of FIG. 2.
Figure 4B:
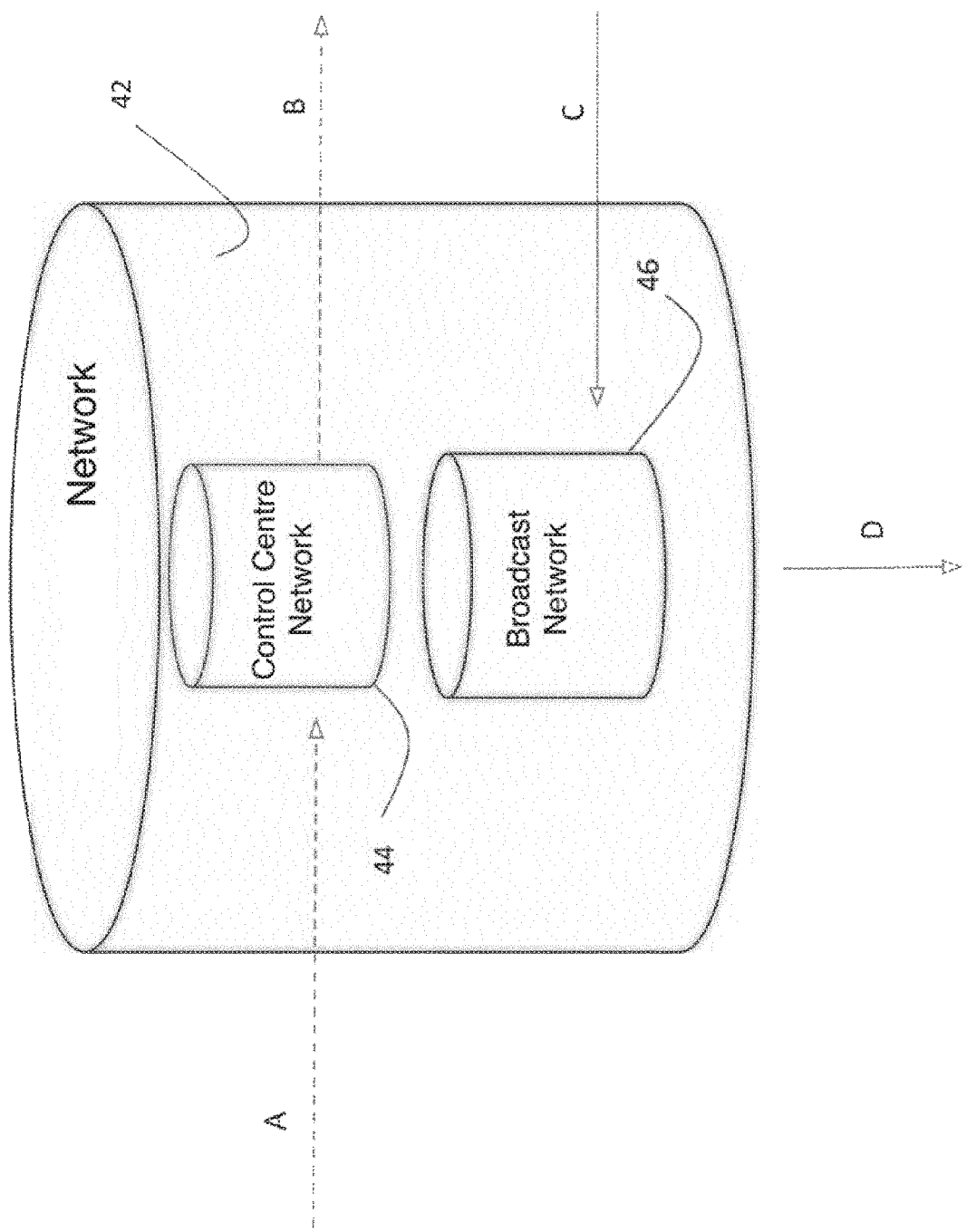
FIG. 4B is a diagrammatic representation of a detail of the system of FIG. 1
Figure 4C:
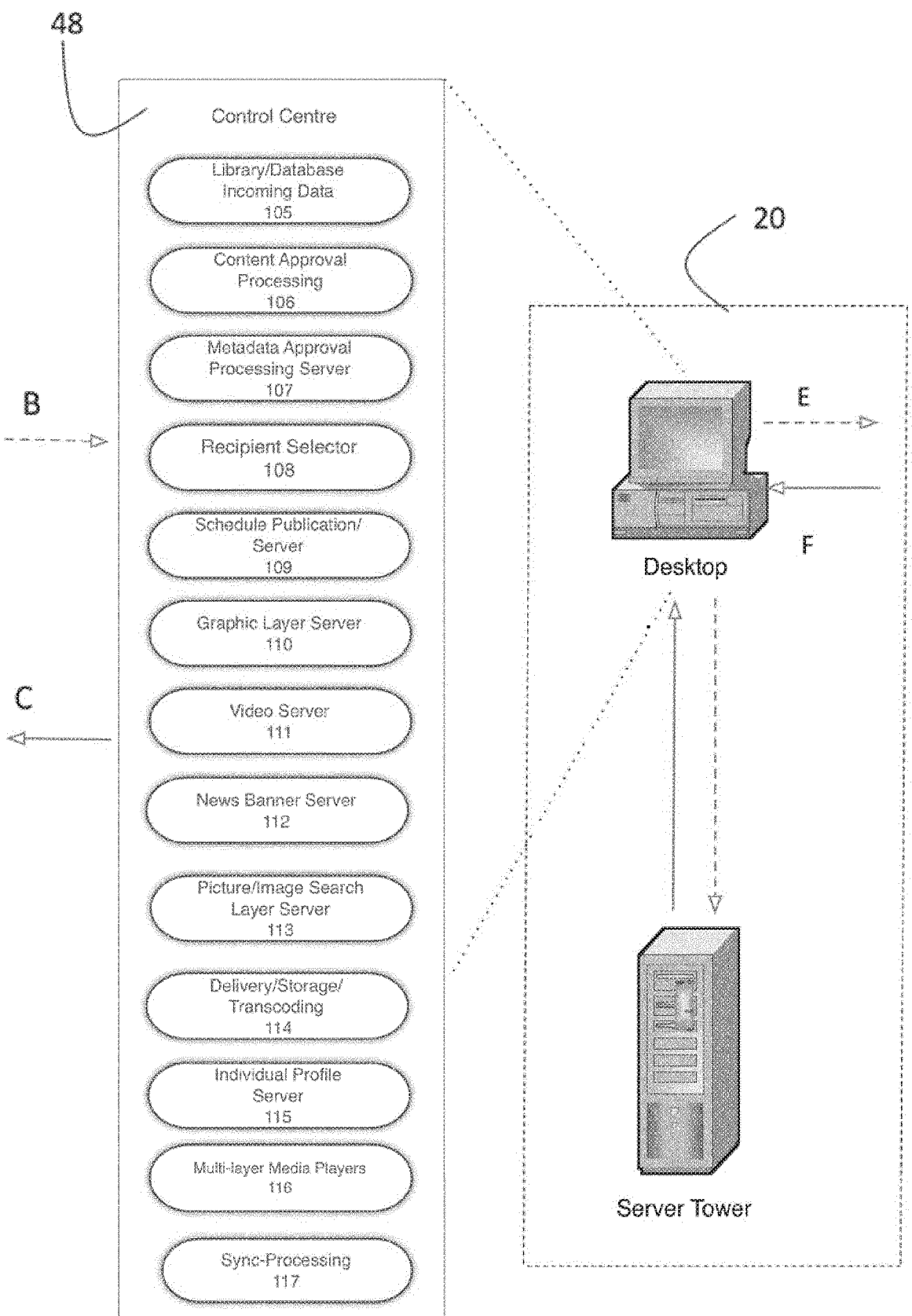
FIG. 4C is a diagrammatic representation of a detail of the system of FIG. 1.
Figure 4D:
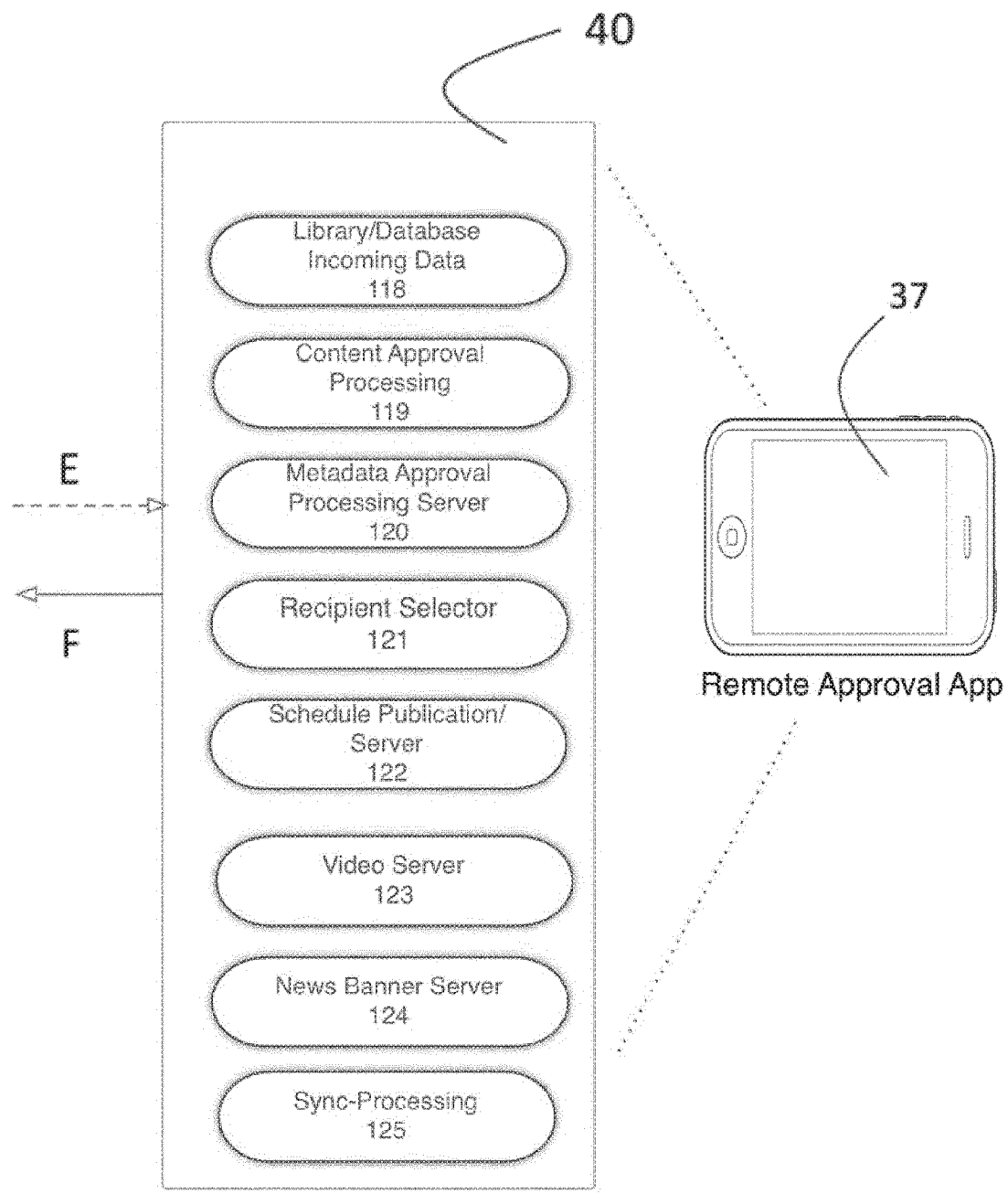
FIG. 4D is a diagrammatic representation of a detail of the system of FIG. 1.
Figure 4E:
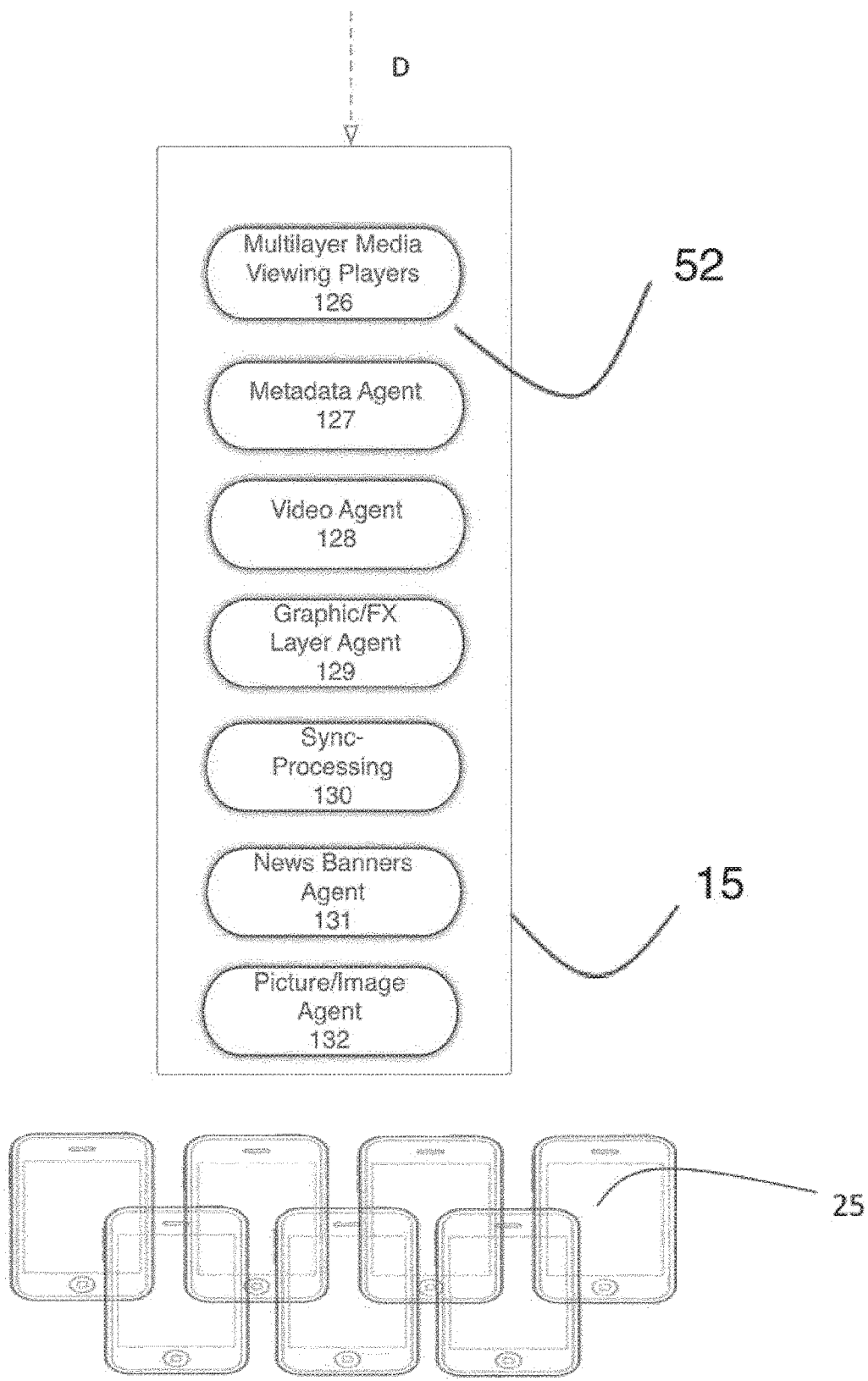
FIG. 4E is a diagrammatic representation of a detail of the system of FIG. 1.

In an exemplary embodiment, an first application 31 resides on the tablet 15 and may be employed by a user to add specified effects to video data. In the example, the first application 31 accesses a database 100 from which the user can select video, audio, image and graphics and where the user can select specified effects. A metadata content agent 101 is configured to link the specified effects which are selected by the user to the video content by way of associated metadata. A sync processing agent 103 is operable to synchronise the specified effect selected by the user with the raw video data so that the specified effects are applied to the video at the particular times selected by the user. A multi-layer media creation player 104 is configured to generate a data structure 32 comprising video data and the control data. The media player which is installed on the remote tablets 25 is operable to read the data structure 32 so that when the video is playing the specified effects are applied at the appropriate times. An exemplary data structure 32 is illustrated in FIG. 2 which includes two components, namely, a video data component 33 containing raw video data captured by the user, and a control data component 35 containing metadata which associates the specified effects selected by the user with the raw video data. At the request of a user, the first application 31 instructs the tablet 15 to transmit the data structure 32 to the control centre 20. A media player 126 is installed on the remote tablets 25 which is configured to read the data structure 32 downloaded from the control centre 20. The specified effects that are associated with the control data 35 are then created and layered on the tablets 25 by the media player 126 and applied to the raw video data 33 as the video is being played. It will therefore be appreciated by those skilled in the art that within the video broadcast system 10 the video remains as raw video, in other words, as a video data without attached graphic(s) or special effects. When the video is viewed by an end-user the tablet 25 synchronously creates the correct high quality graphics, text and special effects via the media player 126. These effects are then overlaid by the multi-layer media player on the respective requiring tablets 25 onto the raw video giving the appearance of a single high quality video file.

The video which was transmitted from the tablet 15 may undergo an approval process in advance of being broadcast to the end users. Furthermore, the control centre 20 may alter the associated control data identifying the specified effects to be applied to the raw video data if desired. In one arrangement, an optional function is provided within the control centre 20 whereby the video and its associated metadata are sent to a designated authorised remote device 37 for remote approval. An approval application 40 is installed on the remote device 37 which is configured to allow a user to interact with the the device 37 in order to approve or disapprove the video content and/or the associated control data. It will therefore be appreciated that the video may be approved either by the control centre 20 or via the remote device 37 prior to being broadcast to the tablets 25. When the approved video is being viewed on the tablets 25 a second application 52 executing thereon creates the specified effects locally on the device. The second application 52 determines which specified effects to create locally on the tablet 25 and if required which to fetch from the local database such as a virtual sets, branded graphic layers etc, based on the content of the metadata in the data structure 32. The special effects are then layered onto the video by the media player 126 giving the appearance of a single high quality video file. Thus is will be appreciated that a fetch process may be initiated to retrieve data either locally stored on the second device or remotely thereof. In one example, the fetch process create specified effects in realtime and fetches any assets that may be associated with that specified effect as instructed by the control data.

The synchronisation process facilitates raw video data to be transmitted quickly and unimpeded through the network 30 along with the associated control data that stipulates, the high quality graphics, text and/or special effects to be simultaneously overlaid onto the raw video data when viewed by the end user using the media player 126 on the tablets 25. Traditionally, graphics and special effects are created with powerful editing suites, which typically requires a process of flattening the graphics, via rendering, and exporting them as a large single video file. By recreating the specified effects/auxiliary data locally and by storing some graphics and images locally on each user's tablet 25, the video broadcast system 10 eliminates the requirement of going through this rendering process. Furthermore, as only the raw video data and associated metadata are being stored and transmitted through the network 30, the speed and costs of producing and broadcasting high quality professional-looking video with high quality graphics and special effects broadcasting is minimised. The network 30 may be any suitable telecommunications network such as, but not limited to, the world wide web, internet, intranet, mobile phone network, or the like.

Referring now to FIGS. 4A-4E which illustrates an exemplary architecture for the video broadcast system 10. The flow of data between the respective entities in the distributed network are indicated by arrows A, B, C, D, E, and F in FIGS. 4A-4E. In the exemplary arrangement, the video broadcast system 10 includes four modules, namely, a first module; a second module; a third module; and a fourth module. The first module includes the tablet 15 with a camera and the first application 31 installed in order to enable a user to create a video, select high quality graphics, text and/or special effects to be simultaneously overlaid onto the video, synced and then to upload the video and associated metadata to the network 30.

The second module is provided as part of the control centre 30. In the exemplary arrangement, the control centre 30 may include a cloud and/or a local server architecture. In the exemplary arrangement, a network 42 is incorporated within the control centre 30. The network 42 is sub-divided into two distinct spaces, namely, the control centre network 44 and a broadcast network 46. The second module is where the user-generated video content is uploaded and stored, and then downloaded to the tablets 25.

The third module includes a control centre application 48, which allows incoming user-generated video to be reviewed and approved remotely and then synced to play on end users' tablets 25 with the specified high quality graphic(s), text and/or special effects and other various metadata fields to be extracted from the local metadata database and synchronously overlaid onto the downloaded video content to give the appearance of a single file. There is also an optional function whereby video and its associated metadata may be sent to a remote device 37, accessible only by designated authorised users, to allow for remote review and approval of media. Once the approval and synchronisation processes are complete, the control centre network 44 broadcasts the video content to end users' tablets 25 via the broadcast network 46.

The fourth module includes the second application 52 installed onto each user's tablet 25. As indicated above, the second application 52 contains the multi-layered media player 126 and an extensive database of high quality graphics, such as virtual sets, logos, branded graphics stored locally on the tablet 25, which will be utilised by the multi-layer media player 126 to enable the layering of specified effects onto downloaded video content as approved and authorised by the control control centre 48. Within the media player 126, the raw video data is played and the recreation and layering of the specified effects is synchronously done using the multi-layer media player 126. The quality standard of effects and graphics are equivalent to professional studio-editing suite effects. The media player 126 in the exemplary arrangement includes a first means for receiving video data and associated control data, a second means for reading the control data, a third means for creating and/or extracting specified data from a database on the portable device based on the control data, and a fourth means for layering the recreated effects and/or the extracted specified data onto the video data in accordance with the control data as the video data is being played.

When a video is viewed on an end-user's tablet 25, the graphics, text and/or special effects that are recreated and/or extracted from the local database and overlaid onto the video are those that have been approved and designated by the control control centre 48 and/or the remote approval application 40 of a designated authorised user. This gives personnel who are authorised to operate the control centre and/or approve media via the remote approval second application 40 additional flexibility in remotely controlling and changing the graphics, special effects and/or text of an already published video. This may be done by changing the associated metadata, for example.

The second module acts as the hub through which all video content and associated metadata is received from a user's first application 31. The uploaded video is accessed, approved and synced by the control centre application 48 via the control centre network 44 and then published by the control centre application to the broadcast network 46. The video is distributed to the second application 52 for viewing by authorised end users. Access to the local secure network 42 may be restricted to the control centre application 48 or the remote approval application 40 of designated authorised users only.

The control centre application 48 may contain a database 105 for storing incoming content/video. A content approval process 106 is provided for approving the video content in advance of publishing. A metadata approval processing server 107 is provided for approving the metadata. A recipient selector 108 is provided for selecting which tablets 25 to transmit the video content to. A schedule publication server 109 is provided for scheduling publication of the video content. The control centre application 48 may also include a graphic layer server 110, a video server 111, a news banner server 112, a picture/image search layer server 113, a delivery/storage/transcoding module 114, an individual profile server 115, and a sync processing module 117, as described below. A media player 116 is also provided which comprises a multi-layer media creation player and a multi-layer media viewing player.

In the exemplary arrangement, the control centre application 48 may receive the upload of user-generated video and associated metadata, via the control centre network 44, which includes the metadata that identifies the original user's choice of specified effects for overlay onto the video. This data is then stored in the database 105. Within the control centre application 48 a content approval process may occur using the content approval processing module 106 by which authorised personnel may approve the user-generated video content for publication. The content approval processing module 106 provides the ability to edit content if so required prior to broadcasting. The metadata approval processing server 107 provides the ability to approve the metadata for all specified effects layers and the text for any selected graphic(s)/special effects. In the exemplary arrangement of the video broadcast system 10, it is the control centre application 48 which carries out the approval process, with the control centre network 44 acting as a conduit through which the data is stored and transmitted. However, it is envisaged that this approval process may be implemented in the cloud itself rather than on an application.

The recipient selector 108 facilitates designation of the end users who will receive or have access to the particular downloadable video content. The recipient selector 108 also communicates with the metadata approval processing server 107 and the individual profile server 115 as individual user-specific changes may need to be made to the graphic (s)/special effects metadata and/or the text metadata displayed on some end-user's tablets 25. For example, this would be the case where a video was being broadcast to a number of different countries; in this instance a parameter may be set that could layer the text to be displayed on-screen in each user's native language. Another example, would be where a user with eyesight impairment needs larger font displayed on-screen etc. This user-specific customisation process will be automated once the personal profile of an individual user has been customised and registered with the individual profile server 115.

Once the user-generated video and associated metadata has gone through the approval process, the schedule publication server 109 may publish the approved video content onto the broadcast network 46 at a designated point in time. The graphic layer server 110 will sync the user-generated video with the original user's choice of specified effects for overlay. The control centre's video server 111 registers each video to be broadcast, with each video also being registered with a video agent 128 located on each user's tablet 25 when requested and played on the end user's tablet 25.

For regulatory and reporting purposes, a digital footprint is assigned to each user on the video broadcast system 10. This digital footprint indicates which videos and/or content the user has viewed/commented upon, for example. In essence, each individual user has a specific agent identified uniquely to them, which is stored on the individual profile server 115. The news banner server 112 will provide a text feed, again stored locally on a user's tablet 25 in a graphic layer agent 129, to superimpose news reel-style banners, for example, ticker tape news banners onto videos. These ticker tape news banners will run text and graphic(s) metadata received directly from the control centre application 48 and/or the remote approval application 40 of a designated authorised user. In the exemplary arrangement, there are three different types of ticker tape news banners: a general news banner for company-wide news (the "General Feed"); a department specific news banner (the "Departmental Feed"); and, a user-specific news banner (the "User-specific Feed"). The general feed will be the same for all users across the company's network. The departmental feed will contain specific information based on the various departments or work categories within the company. The user-specific banner will be tailored to each individual user in accordance with their personal profile as registered and customised within the individual profile server 115. This news feed will emanate from the control centre application 48 and/or the remote approval application 40, but will also extract and incorporate any of the user's own reminders and notifications that are stored locally in their planner on their own tablet 25.

Once a user has created a video using the first application 31 they may then wish to choose a particular type of special effect such as a picture-in-picture ("PIP"), this process allows one video to be displayed on the mobile device as full screen whilst at the same time an additional video clip/image may be displayed in an inset window on-screen. They are able to search the Video/Audio/Image/Graphic Database located within the broadcast network 46 for suitable images for insertion into their selected PIP special effect to give their video a professional-looking appearance, or alternatively upload a new image, audio, graphic to be used. The metadata associated with the image chosen by the user will then be downloaded from the broadcast network to the control centre network 44 along with the user-generated video and other associated metadata. The picture/image search layer server 113 located within the control centre application 48 is operable for syncing this data taken from the database located within the broadcast network 46. The user-generated video content, associated metadata and accompanying image(s) then all get synced in the control centre application 48 via the sync processing module 117 to create a final high quality video complete with synced layered images and specified effects. This whole interaction with the broadcast server will occur whenever archive approved media such as a picture, audio, a graphic representation of a document PDF, png etc is to be incorporated as part of a new piece of broadcast content.

The video broadcast system 10 may use a contextual search engine to identify suitable content. One example would be to locate images for overlay onto the user-generated video. The image and its associated metadata are stored in the secure broadcast network 46 and are retrievable using defined search parameters. The way in which images (metadata) and text (metadata) are overlaid on a user-generated video is through the use of defined template parameters, which control how the multi-layer media player create, display and animate/manipulate the imagery/graphic(s). For example, these automate the positioning and length of each image plus the length of time for which it is displayed, all of which is approved and controlled by the control centre application 48. An example of such a parameter can be seen in the picture-in-picture ("PIP") proportioned scaling factor ("PSF") described below. The PIP feature, is where one video may be displayed on the tablet 25 as full screen and at the same time an additional video clip or an image is displayed in an inset window, this is done using alpha compositing. Through the use of a number of scripted equations, the video broadcast system 10 extracts the ratio between width of the source clip and the first PIP clip and multiplies it with the scale factor of the first PIP to output the final scale factor to be applied to the new one. In other words, the workflow scales up or down the PIP clips depending on their relative size to the first PIP clip composed and the scale factor applied to it. Once this proportioned scaling operation has been done, it lets the user position the PIP clip and add an offset correction parameter to fill up any black areas as result of format discrepancies.

The following is an example of how the proportioned scaling factor ("PSF") is produced:

$$PSF = 1^{st} PIP\ Scale \times (Width\ ratio + offset)$$

$1^{st}$ PIP clip Scale=0.7
$1^{st}$ PIP clip width=720
src PIP clip width=1.280
Width ratio=720/1280=0.5625 offset=0.097 (user defined)

$$PSF = 0.7 \times (0.5625 + 0.097) = 0.46165$$

There are three lines of information that feed each graphic for the subsequent PIP clips: (i) the clip's own width; (ii) the first PIP clip's width; and (iii) the scale factor applied to the first PIP clip (i.e. 0.7 would be 70 pc of the original size). This model may be extended to address other geometrical issues and reformatting options.

The user prior to uploading a video will be guided through a PIP insertion process, whereby the raw video data (i.e. the full screen clip) will be replayed and the user will select the image(s) and any other graphics, text or metadata to be inserted at various points along the full screen video when it is played, and these specified insertion points become part of the metadata, letting the video broadcast system 10 know when the selected image is to be displayed. The control centre application 48 will approve the final video prior to publication which simultaneously will make the individual graphics, special effects and customised text available in the broadcast network 46, and the end user on viewing the approved product will download the video and the associated metadata identifying the selected images, which will both be synchronously displayed within the multi-layer media viewing player 126 at the correct moment on the timeline.

Figure 9:
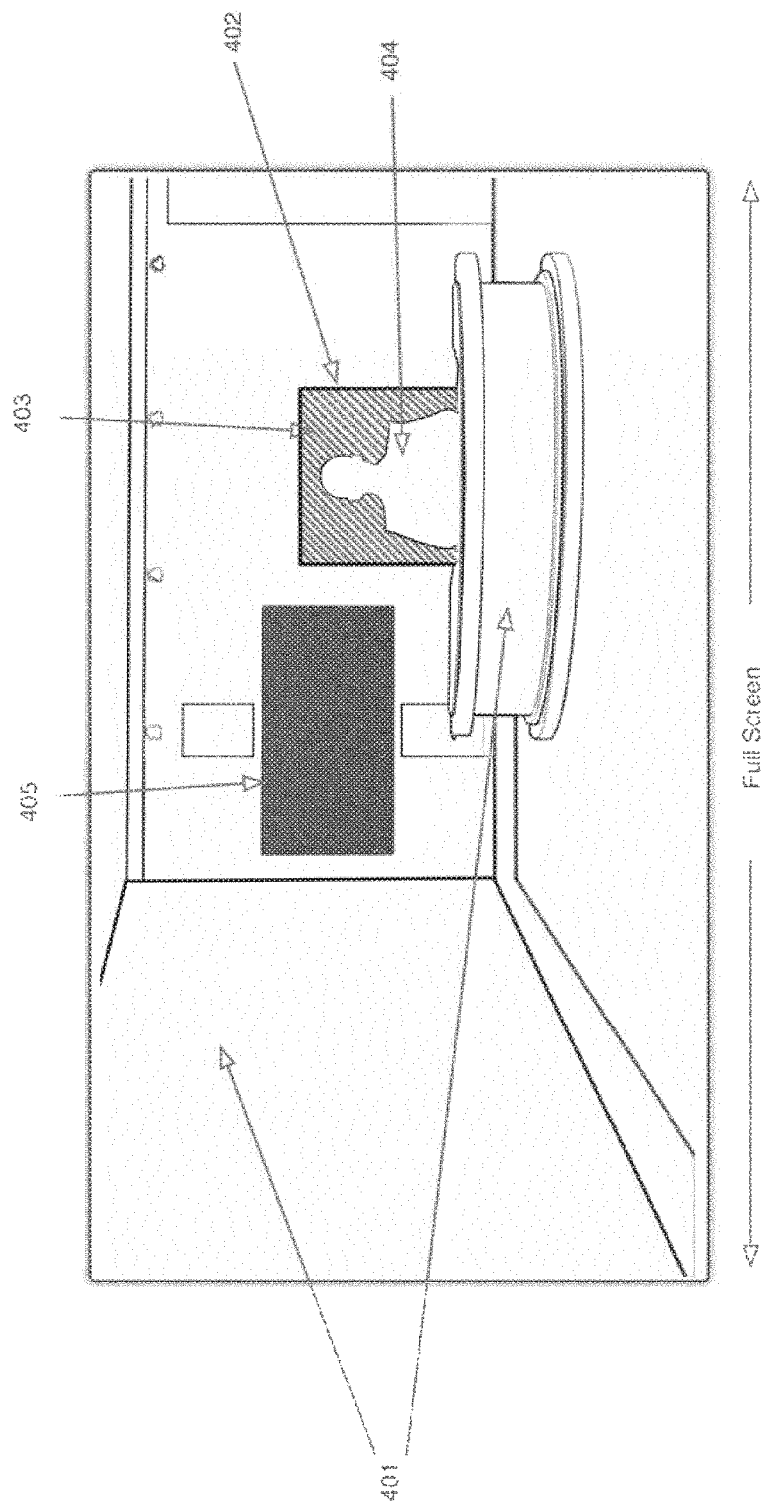
FIG. 9 is a diagrammatic representation of a template.

Exemplary templates are employed by the video broadcast system 10, to deliver High Definition quality video's and video broadcasts at a fraction of the file size, it will be appreciated that viewing HD broadcast content using the video broadcast system 10 will improve the download and upload speeds and bandwidth requirements to view and upload an equivalent 1920×1080(HD) video or an equivalent of any other resolution size. An example is illustrated in FIG. 9, which are designed to act as a guide for the placing of subjects on-screen, for example, a green screen template that can be used to capture a subject sitting at a news desk whilst filming 401. Advantageously, these unique templates have a designated minimal capturing resolution area 402. This area is what is sent and used as the video data within the video broadcast system 10; this area only requires chroma keying. As a result, there is a minimal area requiring chroma keying 403 in order for laying the two image(s)/video streams together which, also leads to reduced rendering times to perform the real time chroma keying process in the tablets 25. As the video subject 404 is only a portion of the full screen when viewed using the media player 126, the video broadcast system 10 uniquely only captures the minimal area resolution 402 required to display the video subject within the chosen full screen template 401 (and not the full screen), resulting in a smaller file size for the video. This smaller video is then composed over a high quality background layer image(s)/templates 401, stored locally within the tablet's local database, which sets the frame size for the final produced video, resulting in a full High Definition 1920×1080(HD) video broadcast at a fraction of the file size. It will be appreciated that this high quality background image/template can itself be a multi-layered composition with additional video/image layers 405.

Each template may be custom-made with unique animation key frames, movements and specific effects, for example, a newsroom template 401 containing an alpha channel can be used to place and compose a subject matter such as a person within the graphic. These templates are designed in such a way that the graphic layers, text and special effects can be changed remotely by the control centre application 48 by changing the associated metadata.

A transcoding module 114 implements the process by which the approved uploaded video content and associated metadata is, prior to final broadcasting, stored locally at its source resolution as a back up, it will then be transcoded, if required, either within the transcoding module 114, or transcoding will occur automatically after the video is uploaded to the broadcast network 46 via the transcoding architecture located within the broadcast network 46.

In one embodiment, the remote approval application 40 of a designated authorised user may receive the upload of the user-generated video and associated metadata which includes the metadata that identifies the original user's specified effects for overlay onto the video via the control centre network 44, this being stored in the remote approval application's database's incoming data 118. Within the remote approval application 40 a content approval process may occur using a content approval processing module 119 by which the designated authorised user may approve the user-generated video content for publication. In addition, the remote approval application 40 contains a metadata approval processing server 120, which approves the metadata for all specified effects layers and the text for any selected graphic (s)/special effects. The recipient selector 121 within the remote approval application 40 facilitates designation of the end users who will receive or have access to the particular downloadable video content.

Once the user-generated video and associated metadata has gone through the approval process within the remote approval application 40, the schedule publication server 122 may publish the approved video content onto the broadcast network 46. Alternatively, the remote approval application 40 may communicate with the control centre application's schedule publication server 109 to facilitate the publication of the approved video content onto the broadcast network 46 at a designated point in time. The video server 123 will also register with the video server 111.

The remote approval application's news banner server 124 will use a specific graphic, again stored locally on a user's tablet 25 in the graphic layer agent 129, to superimpose ticker tape news banners onto videos. These ticker tape news banners may run text and graphic(s) metadata received directly from the remote approval application 40 of a designated authorised user. The user-generated video content, associated metadata and accompanying image(s) get synced in the remote approval application 40 via the sync processing module 125 to create a final high quality video ready for publication onto the broadcast network 46.

The second application 52 contains its own multi-layer media viewing player 126. This media player 126 houses the metadata content layers, recreate effects player, transparency levels and synchronicity systems that allows it to perform and display the pre-mentioned effects correctly. A metadata agent 127 performs the actions instructed by the control centre application's metadata approval processing server 107 and/or the remote approval application's metadata approval processing server 120, for example, the overlaying of text over a specific graphic. The video agent 128 contained within the tablet's second application 52 plays the video of choice and registers with the control centre's video server 111 and/or the remote approval application's video server 123, and the individual profile server 115 that the particular end-user has viewed the video, thus creating a unique individual user digital history.

The graphic layer agent 129 registers with the control centre's graphic layer server 110 which graphic(s) are to be displayed on the end-user's video as overlays. The second application 52 then displays the specified high quality graphic(s)/effects that have been approved to run with that individual video by the control centre application 48 and/or the remote approval application 40 of a designated authorised user. The sync-processing 130 syncs the approved video, associated metadata and specified effects as approved by the control centre application 48 and/or the remote approval application 40 of a designated authorised user to enable the multi-layer media viewing player 126 to display these as though they where a single video. The news banners agent 131 receives regular metadata feeds from the control centre news banner server 112 and/or from a remote approval application's news banner server 124, which can be updated periodically, for example, daily, hourly or by the minute.

The picture/image agent 132 contained within the tablet's second application 52 registers with the control centre's picture/image search layer server 113, which pictures need to be downloaded along with the associated video being played. The image file is then downloaded and inserted into the designated x-y co-ordinate of the chosen full frame resolution template with little or no rendering required.

Figure 5:
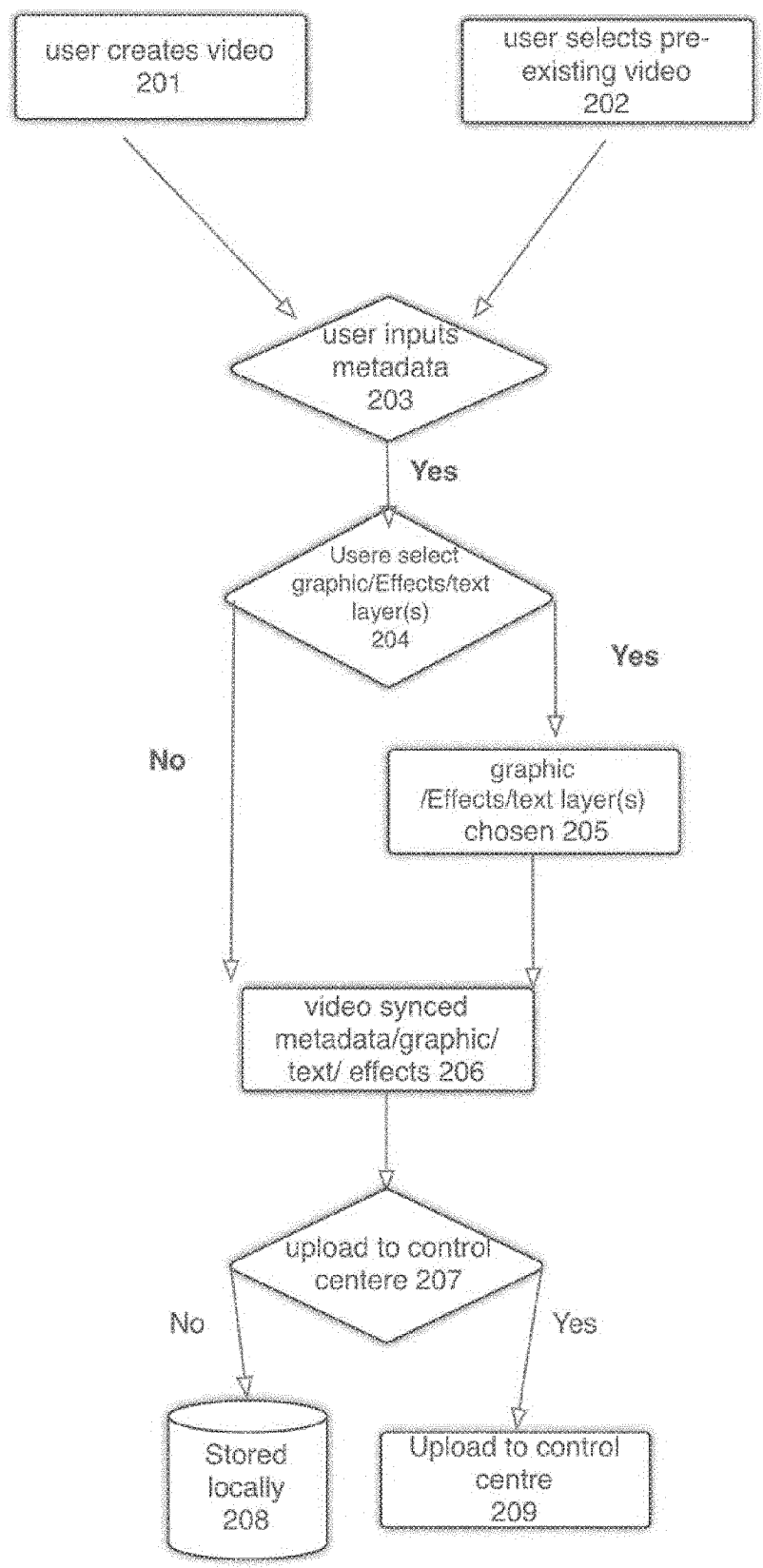
FIG. 5 is a flowchart illustrating exemplary steps for uploading video content to the system of FIG. 1.

FIG. 5 depicts an illustrative methodology for uploading a video with the accompanying metadata identifying the choice of high quality graphic effects and text that is to be applied to the video. This process is illustrated as a collection of blocks in a logical flow graph, which represents a sequence of operations that can be implemented in the first application 31 installed on the tablet 15. The blocks represent computerised instructions executed by the application based on the user's actions. The workflow is illustrative of the process performed by the first application 31. Before the user can upload the video to the control centre, step 209, with the accompanying graphic(s) and metadata, the user must choose a pre-existing video or create a new video, steps 201 and 202; write the metadata to be displayed with and/or to be displayed on the video using the metadata content agents, step 203. Then choose/create the specified effects graphic(s)/effects if required, steps 204 and 205, and then sync, via the sync-processing, step 206. The first applications's sync processing module 103 communicates with the control centre's sync processing module 117 to enable metadata to be synced to the control centre's metadata approval processing server 107, graphic layer server 110 and video server 111 on uploading.

The sync process created on the first application 31 installed on the tablet 15 will isolate the chosen specific video with the user's selected specified effects graphic(s), text, special effects and metadata. When uploaded to the control centre it will register and sync that data, for example, the graphics and effect(s) created and the text metadata content added. Once published/broadcast on download the specified effects and specific graphic(s) within the second application 52 will recreate the specified effect locally on that individual device and can pull up a picture that was used and insert that same content and broadcast the same video broadcast on every tablet 25, other than when an individual has specific needs, such as the text needing to be displayed in a different language. Again specified effects are not downloaded with the video but are re-created on each tablet 25 upon the initial download of the application. However, there will be new graphics (e.g. logo, branded graphics), pictures and effects projects created by the control centre which will be made available instantly, or downloaded periodically, automatically or on request.

The user will either capture a video clip using his tablet's camera or will choose a pre-existing video clip from the native application's video library, step 202. The user will type in specific data about what is being filmed, step 203 (e.g. "Damian Purcell, CTO of Secure Broadcast. Talks today about a particular topic"). This data is automatically inserted within the parameter of a specified effect or specific chosen graphic, step 204. Here the user will create a specified effect or choose a project effect add text, fade in or out transform crop etc, once approved and viewed by end user the user will only download the video data and the control data will recreate as in clone what was created by the originator of the video content. The originator may choose from a database of custom-made graphics stored on the tablet database, which has the meta sync agents and servers that attach the graphic and text to that particular video; they also have the automated resizing and parameter controls that sits the text neatly within the graphic.

The user may not wish to choose a graphic; in this instance the video will be synced with the metadata only, step 206. There is mandatory metadata that the user may input in order to upload a video. This metadata is also used within the search functionality. This metadata may not be visible to the end user but will form the information/data content that aids in the search-ability of the video within the search engine. The user may alternatively choose a specific graphic to go with a particular video, step 205, this would then be synced with the video and associated metadata, step 206.

The video will then be uploaded to the control centre, step 209. The user has the option, step 207, to upload the video immediately to the control centre, step 209, or to save it locally on their tablet to upload at a later stage, step 208. This option will be useful where the upload speed might be greater at different IP addresses/intranet locations etc.

Figure 6:
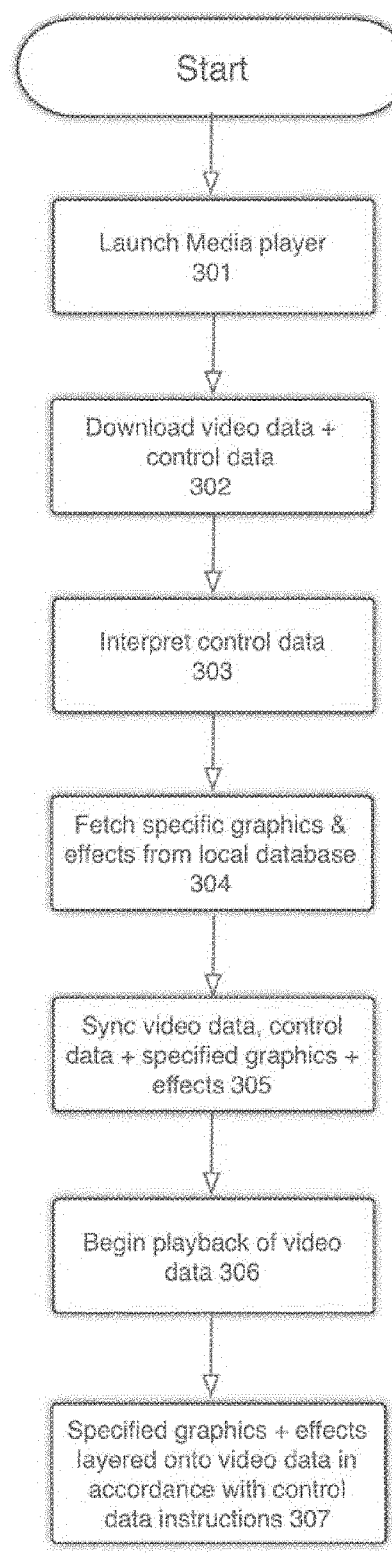
FIG. 6 is a flowchart illustrating exemplary steps for implementing the layering of specified effects onto video content by a media player which is also in accordance with the present invention.

FIG. 6 depicts an illustrative methodology for implementing the layering of specified effects onto downloaded video content by a media player in the second application 52. This process is illustrated as a collection of blocks in a logical flow graph, which represents a sequence of operations that can be implemented in the second application 52 installed on the tablet 25. The blocks represent computerised instructions executed by the application based on the user's actions. The workflow is illustrative of the process performed by the second application 52. The media player within the second application 52 is launched, step 301, and then receives the video data and the associated control data, step 302. The multi-layer media player interprets the control data, step 303, and recreates, builds and assembles the specified effects and graphics locally for overlay onto the video data, step 304. The media player syncs the video data, control data and specified effects, additional graphics and effects, step 305. The media player then begins playback of the video data, step 305, and overlays the specified effects and any additional as layers on top or behind the video in accordance with the insertion points specified within the control data, giving the appearance of a single video file, step 307.

Figure 7:
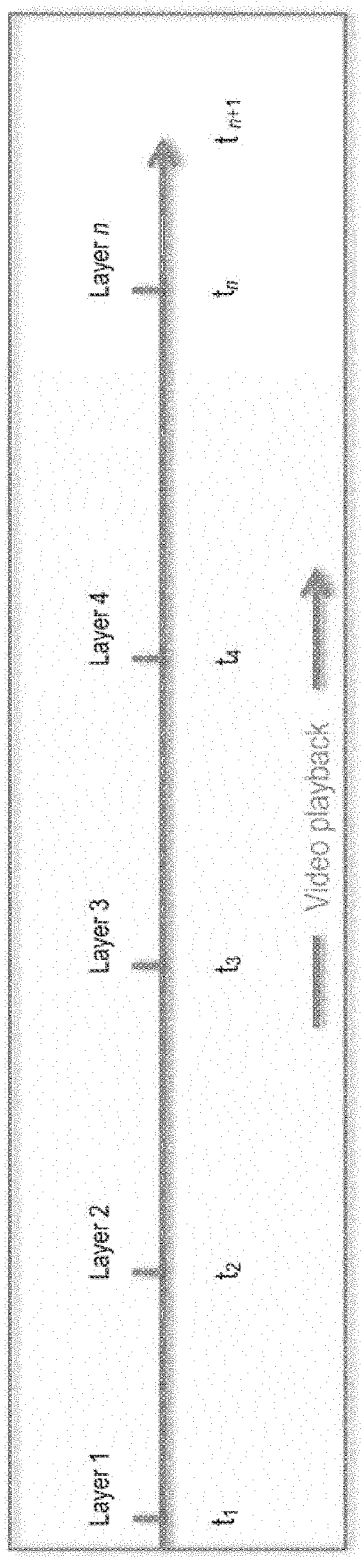
FIG. 7 is a schematic representation illustrating how the multi-layered data structure is produced by a media player.

An example of how the layering of specified graphics and effects is achieved is illustrated in FIG. 7, whereby Layer 1 is to be applied during the time interval from t(1) to t(n+1), where t(n+1) is the end of the video. Layer 2 is to be applied during the time interval t(2) to t(4); Layer 3 is to be applied during the time interval t(3) to t(4), and so on, until the last later, Layer n, is applied between t(n) and t(n+1). There may be a plurality of layers applied at any one point in time, for example, at time interval t(3) Layer 1, Layer 2 and Layer 3 shall each be applied to the video concurrently.

Figure 8:
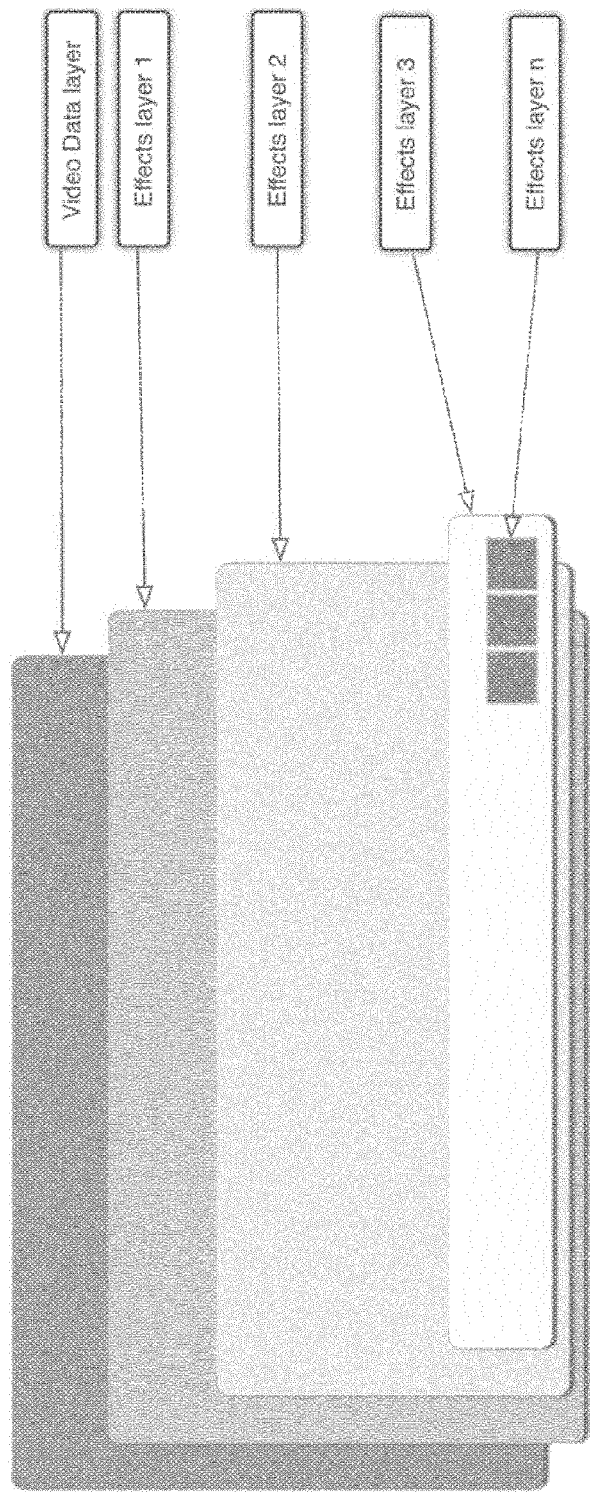
FIG. 8 is a diagrammatic representation of the layering of specified effects onto downloaded video content produced by a media player.

FIG. 8 depicts an example of the layering of specified effects onto downloaded video content which may be produced by the media player 126 in the second application 52. Each object within a layer (e.g. colour block, text, image, graphic etc.) may be animated independently of each other. Furthermore, every attribute of every layer is also animatable (opacity, location, colour, position in 3D space etc.), such that there may be any number of animations applied to each layer.

Each video to be broadcast will be stored within the broadcast network 46 in multiple resolutions. The broadcast network monitors the network bandwidth of an end user's tablet and, depending on this bandwidth, the most suitable video resolution (i.e. the resolution that will enable the fastest download) shall be broadcast to the end user's tablet for viewing, transcoding and delivery 114 is created within the control centre application, the second application via the media player 126 will determine resolution download.

Traditionally, when multiple videos are to be broadcast they are edited in such a way that they flow from for example, an opening title, the video, captions during video play, end titles, a commercial or sting, another opening title effect, then another video, end titles effects, etc. In an exemplary embodiment a system is provided whereby a user can select one or more videos and place them in any particular order and assign them to a 'seamless broadcast' as graphically illustrated in FIG. 12. A Video Scene Markup Language (VSML) is used to define special effects to be associated with the selected videos. The media player is configured to read the VSML elements and compose them into effects. The effects are played as the video is being played. The effects and videos are displayed on the user device to give the appearance of a broadcast.

In an exemplary arrangement, the control data includes machine readable markup language that represents video data elements in a textual format that the media player can interpret and compose at playback. The video data elements that are described by VSML include but are not limited to textured blocks, text, images, downloadable video assets, streaming video assets and other graphical elements that are combined to provide motion graphic layers. VSML describes these elements in a JSON format, which represents the video on the server side. At playback, the media player on the second device does not display the textual descriptions but rather uses them to interpret the manner in which they should be played back as a video package. In one example, non-streaming video layer assets are cached locally in high definition so that the streaming content of a video is separated from the other reusable content to create HD motion graphics layers. Some of the look and feel of these HD motion graphic layers is dictated by control data that is received from the server side at start time. This control or meta data influences aspects of the HD motion graphic layers. However the presentation of these HD motion graphic layers is primarily controlled by the Video Scene Markup Language (VSML), which can be modified on the fly from either the local media player or a remote administrator. The VSML controls the positioning, timing, styling and animation of the specific HD Motion Graphics layer.

VSML consists of a JSON representation of a video project, which is separated into segments, layers and elements. Elements are the building block of the video document. The following is an example of a single video stream with an image watermark overlay in the top left corner of screen that starts at time 3 and animates out at after 10 seconds:

```
{
    "duration": 120,
    "segments": [
        {
            "layers": [
                {
                    "layerType": "generic",
                    "elements": [
                        {
                            "type": "video",
                            "url": "sbtv-assets:///275"
                        },
                        {
                            "frame": {
                                "w": 300,"h": 100,"y": 0,"x": 0
                            },
```

```
            "beginTime": 3,
            "duration": 10,
            "type": "image",
            "url": "http://path/to/image/url"
          }
        ]
      }
    ]
  }
 ]
}
```

In this way, video segments, layers or elements can be re-used or nested within other video segments, layers or elements and this converts a video into a flexible document that can be manipulated in real time.

Typically, the effects are interleaved between the multiple videos. However if a video is downloading/streaming under low bandwidth conditions there will be increased video buffering required and the bandwidth speed will dictate when the video will be played. Video that displays buffering is not considered seamless or an uninterrupted broadcast. The media player and control data allows for the delivery of a High Definition content which is recreated using instructions via VSML locally and graphically displayed at the fraction (1/1000 or more) of the bandwidth compared to an equivalent video version. By virtue of the fact that the media player and control data are not dependent on a large bandwidth allows meta segments (control data that creates motion graphics/specified effects without video) instructed via (VSML) to be placed between each of the selected video segments (control data that creates motion graphics/specified effects with video). The selected video segments which contain their own control data can talk to each of these sets of meta segments and place their own data within them, known as Pre-Video Play-Data (PVPD) for example: "Coming Up Next" meta segment, the new video will have its metadata (control data) and the "Coming Up Next" will gather that information and display it visually on screen prior to the video being played or ready to be played due to a buffering delay. It is also noted that each of these videos themselves will have motion graphics applied via VSML in a real-time layered composited fashion, for instance an opening title, captions during the video and after and a bumper (end title).

If a video displays that it is buffering and users are waiting whilst nothing else is happening besides waiting for the buffering to finish and the video to play, then this is not a seamless broadcast. The downloading of the video data to the smart device often causes the video to stutter or stop playback where the rate of playback has exceeded the rate at which the video is being downloaded. This diminishes the visual experience for the user and is therefore undesirable. The present teaching allows for seamless uninterrupted broadcasting which overcomes the visual appearance of a time delay while the video is being loaded/buffered. The media player recreates meta segments via VSML instruction (control data) which applies motion graphics, text, effects animation, that are recreated in the media player locally via metadata, they do not require significant bandwidth and rely on control data to recreate specified effects in a real-time layered composited fashion (motion graphics) within the player locally for any length of time.

The prior playing meta segment (e.g Opener 801) reads the buffering required for the next video 802 to play, the media player 126 is configured using an algorithm to read the speed of the internet, the size of the video and any assets and the time it takes to stream the video without further buffering delays. As the sets of meta segments are largely independent from bandwidth limitations the algorithm provides data to the media player to slow down these motion graphic sets proportionate to the requirements for seamless broadcasting. In essence the meta segment will slow all of its movement, graphics, text assets etc, motion until the video which comes on after its buffered enough for continuous play. In the situation where the video needs more buffering due to a drop in internet speed or a internet disconnection the media players local default screen will appear as it tries to reconnect.

Figure 10:
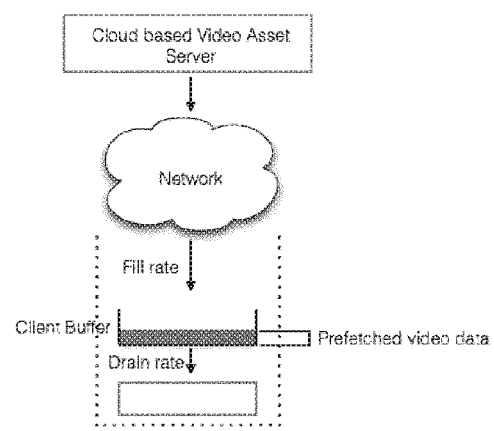
FIG. 10 is a diagrammatic representation of video data being down loaded to a client device.

The following algorithm may be used when applying buffer time to meta segments. If the time required to buffer the video=T, and the duration of a meta segment=D, the following if, then else statement may be used to set a dynamic duration, DT on the meta segment:
If T>D:
Then DT=T
Else DT=D Video data is typically encoded at a bitrate and a fixed frequency of frames, e.g. 1 Mbps at 30 frames per second. With adaptive streaming, there are multiple bitrates available for different network throughput conditions. As illustrated in FIG. 10, each video stream requires a client buffer so that temporary drops in received data rate can be smoothed out. Drops in the fill rate occur due to TCP congestion control. Experimental results have shown a buffer size of 5 seconds is typically chosen. The time it takes to fill the client buffer can be computed from the following metrics:

$\alpha$=Throughput of link,—measured in advance
$\beta$=Size of uncached assets,—known in advance
$\gamma$=Time to set up TCP connection,—approximated to 500 ms (actually 1.5 Round Trip Time)
$\delta$=Buffer size,—using best practices (typically 3-10 s of video)
$\epsilon$=Initial Video Bitrate, The following formula can be used to determine the buffering time for a video:

$$T = \gamma + \frac{\beta}{\alpha} + \frac{(\epsilon * \delta)}{\alpha}$$

Example:
  With a 2 Mbits/s throughput, it would be:
  Initial bitrate of a H264 video file is 1.58 Mbit/s (which will work for the entire connection since its 2 Mbit/s link—i.e. no need to reduce bitrate quality with adaptive streaming)
  Throughput of a network connection is measured and found to be 2 Mbit/sec.
  Size of 5 uncached image assets (30 KB each) is known to be 150 KB need to convert to MegaBits 1 MB=1048576 bytes (=$1024^{MBits}$)
  Therefore 150 KB=150*8 Kilobits=1200/1024 MBits=1.17 Mbits
  Time to set up TCP connection approximated to 500 ms—you can't measure this, but it will be in range 100 ms-800 ms.
  Buffer size using a 4 seconds of video (the buffer length is arbitrary and needs to be large enough to handle TCP congestion jitter)=4*1.58 Mbit/s=6.32 Mbits.

Using the formula above, with a 2 Mbits/s throughput, the time for buffering would be:

T=0.5 s+(1.17 MBits/2 Mbits/s)+(6.32 Mbits/2 Mbits/s)=4.245 seconds

With a 1 Mbits/s throughput, it would be:

T=0.5 s+(1.17 MBits/1 Mbits/s)+(6.32 Mbits/1 Mbits/s)=7.99 seconds

With a higher bitrate (e.g. HD 1080p video at 4.5 Mbits/s) with a 1 Mbit/s link:

T=0.5 s+(1.17 MBits/1 Mbits/s)+(18 Mbits/1 Mbit/s)=19.67 seconds

With a 10 Mbits/s throughput, it would be:

T=0.5 s+(1.17 MBits/10 Mbits/s)+(6.32 Mbits/10 Mbits/s)=1.249 seconds

With a higher bitrate (e.g. HD 1080p video at 4.5 Mbits/s) with a 10 Mbit/s link:

T=0.5 s+(1.17 MBits/10 Mbits/s)+(18 Mbits/10 Mbits/s)=2.417 seconds.

If buffering time<(less than or equal to) normal eg. Opener duration, then bumper duration remains the same.
If buffering time>(Greater than) normal bumper duration, the eg. Opener duration is set to buffering time.
Spread Buffer Time (SBT)
If there is more than one set of specified effects (meta segments) as described by the term Opener, Bumper or Sting than the calculated Buffer Time may be spread evenly throughout each set. Under this circumstance then spreading out the buffering time amongst separate meta segments. Where generic sets of specified effects (Motion Graphic) are classed as meta segments:
O=Opener
  B=Bumper
  S=Sting
In the case where we have more video segments contained in a single video package, where there is an Opener before the video segment, the buffering time for the video package can be spread out over the different segments. Each set of meta segment that plays after the initial Opening meta segment may comprise of at least one of a graphic, text data, a special effect, local based assets and will operate under a shared buffering time SBT for the next video to be played, whether its an "Opener" for a video, a "Bumper" which plays after the video, or a "Sting" (eg Commercial) played between an opener and bumper. The algorithm will be modified in the following way.
To calculate SBT and the T value for each segment and to apply the shared times the equation in this case would be:

$$T1 = \gamma + \frac{\beta}{\alpha} + \frac{(\varepsilon * \delta)}{\alpha}$$

for the initial bumper, $$TN = \gamma + \frac{(\varepsilon * \delta)}{\alpha}$$

for all other bumpers. Where N (number) used for that segment.
Example:
Assume a video packaged which contains two videos encoded at the same bitrate of 1.58 Mbit/s. Throughput is 2 Mbit/sec. In the first video segment, there are 2 assets of size 0.595 Mbits and in the second video segment, there are 2 assets of size 0.595 Mbits. Time to set up TCP connection=0.5 s. Buffer size using a 4 seconds of =4*1.58 Mbit/s=6.32 Mbits. Using the formula above, the time for buffering would be:

T1=0.5 s+(0.596 MBits/2 Mbits/s)+(6.32 Mbits/2 Mbits/s)=3.9575 seconds

T2=0.5s+(0.595 MBits/2 Mbits/s)=0.7975

Figure 11A:
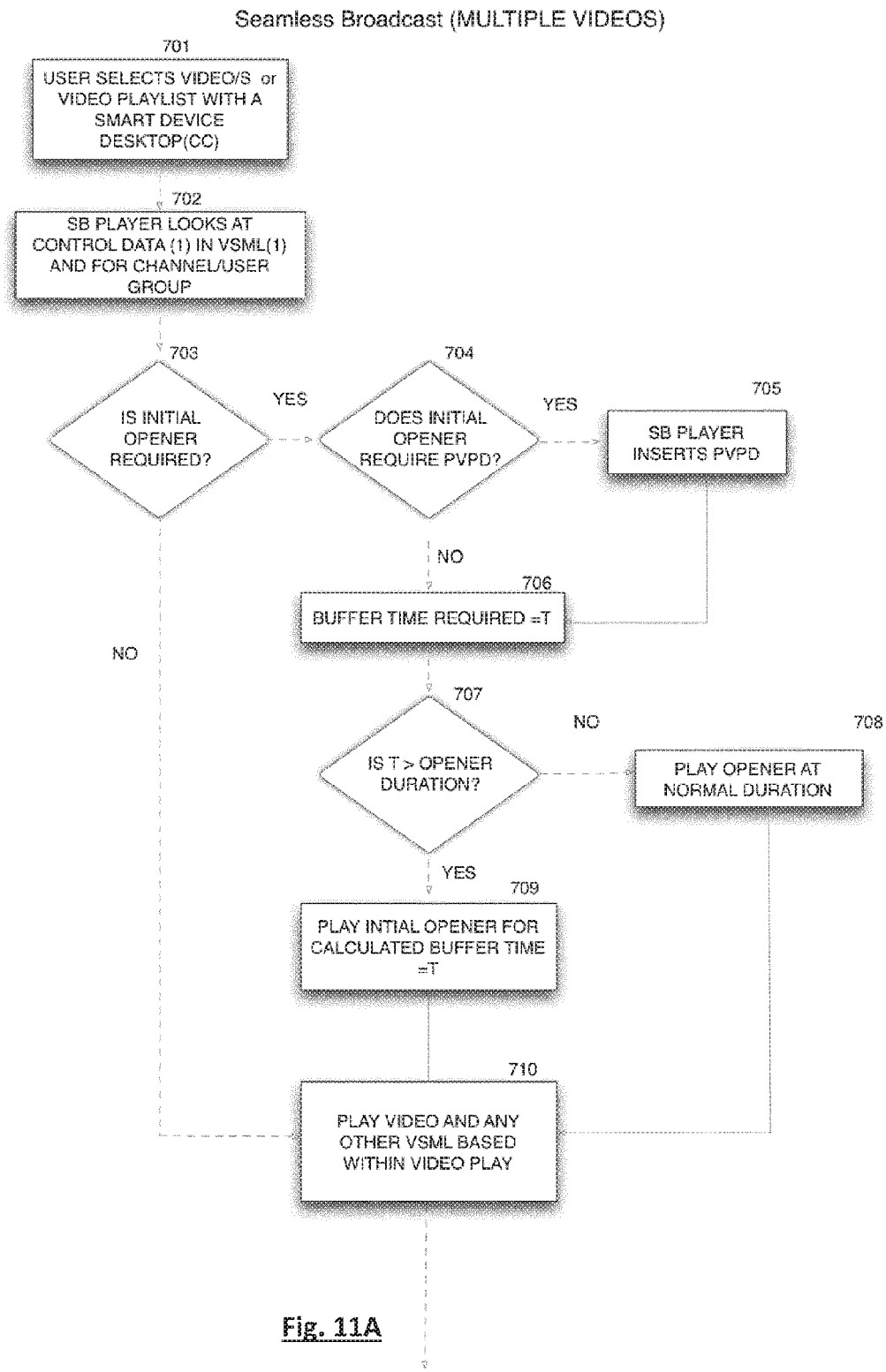
FIG. 11A is a flow chart illustrating the steps for providing a seamless broadcast of multiple videos.
Figure 11B:
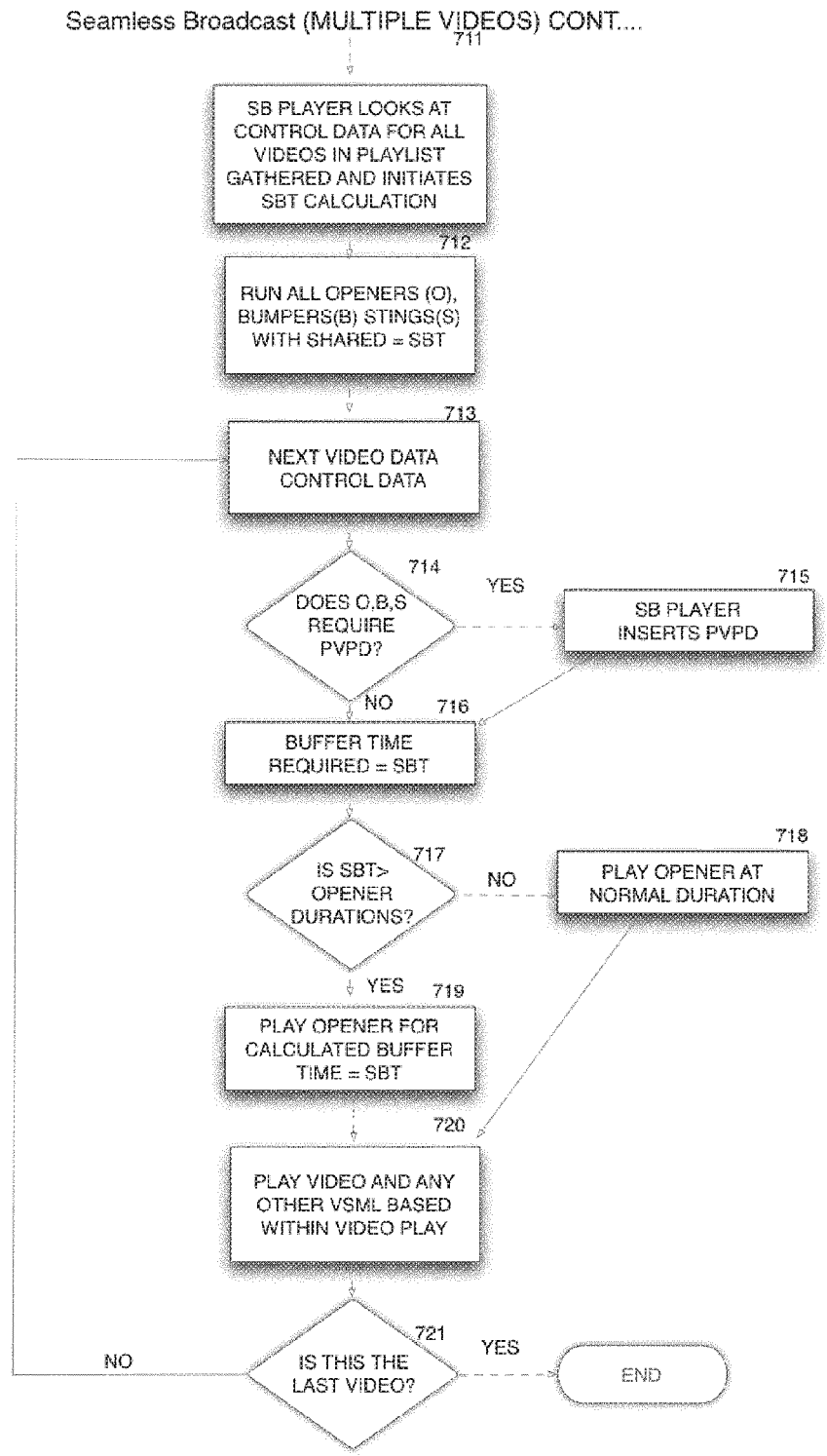
FIG. 11B is a continuation of the flow chart of FIG. 11A.
Figure 12:
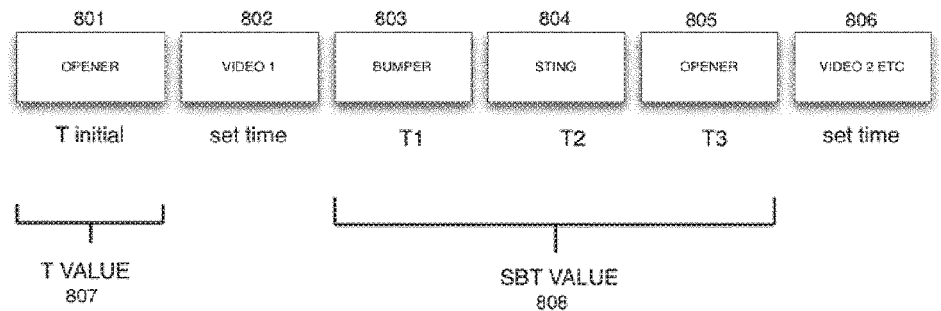
FIG. 12 is a diagrammatic illustration of a seamless broadcast of multiple videos with auxiliary data segments.

If buffering time<normal bumper, sting and opener duration, then bumper, sting and opener duration remains the same. If buffering time>normal bumper, sting and opener duration, the bumper, sting and opener duration is set to buffering time as calculated via SBT.
It will be appreciated that variation to calculate buffering times may be used. In an exemplary arrangement, a continuous seamless broadcast may be provided using looping or multiple effects. The media player waits for the next video to be approved but in the mean time runs continuous motion graphics and indicates, there are no more videos to be played and as soon as one is authorised it will broadcast it in a manner as previously described.
An exemplary seamless broadcast method is illustrated in FIG. 11A. A user selects a number of videos using a client device for broadcasting over the network using the broadcast system 10 of FIG. 1, these videos have been approved and authorised within the system, block 701. Each video will automatically have Meta segments as described as Opener 801, Bumper 803 or Sting 804 placed before or after the video segment 802, 806, the video segment itself will have motion graphics as described by VSML.
The media player on the second smart device 25, reads the control data as described in VSML which interprets the manner in which effects, text, animation etc should be played back as a video package (meta and video segments as illustrated in FIG. 12), block 702. Other, control data such as which channel and user groups are also processed. The seamless broadcast project will normally begin with an Initial Opener (meta segment) as buffering begins and other assets are being downloaded and processed, block 703. The initial opener (meta segment) may have fields—Pre-Video Play-Data (PVPD) that can be filled by the video segments control data, even prior to it being streamed, or before buffering commences. It may be as simple but not limited to a title and description of the next video segment, in essence the control data of the video segment is used by the meta segment proceeding it and that data enters the meta segment and is used and played with all parameter influences based within the meta panel as built with VSML, block 704.
At block 705 a process is initiated where the PVPD is inserted into the available fields within the meta segment. At block 706 the buffering time T is calculated using the algorithm as described above. At block 707 the media player determines if T is greater than the meta segments normal play duration. If this is the case the media player runs the meta segment equal to T, block 709. If T is less than the meta segments normal play duration, block 708, then the meta segment plays at normal play duration. By this stage the video segment has buffered enough to play in a continuous state of play, block 710. The video segment that plays may also have its own motion graphics as described within VSML. Referring now to FIG. 11B which is a continuation of the flowchart of FIG. 10A. At block 711 the media Player gathers all other control data for all video segments to calculate the shared buffer time (SBT) calculation as described above. The SBT calculated durations are applied to all other meta segments within this single seamless broadcast, block 712. At block 713 the next video to be played is queried. At block 714 it is determined whether PVPD 714 is required, if so then, at block 715 the media player inserts this data. The calculated SBT buffer time, block 716, applies its value and if it is found to be greater than the meta segments normal playing duration, block 717, its duration is changed to equal the calculated SBT duration 719, or is otherwise played at normal duration 718 if it is not greater than. At block 720 the video segment has buffered enough to play in a continuous state of play. The video segment that plays may have its own motion graphics as within VSML. At block 721, if this is the last video in the playlist then the seamless broadcast will end if not the loops from block 713 until the final video is reached.

Referring now to FIG. 12 there is provided a graphical representation illustrating the placement of meta segments in relation to video segments. Meta segment 801 is the Initial Opener and has the value of buffering time calculated as T, this allows time for SBT calculation to be made and processed. Video 802 is a video segment which would be a video that has been authorised and has its own motion graphics that is read by the media player and is recreated locally on a second device as described by VSML. Meta segment 803 immediately plays after a video segment 802, it could simply be an end title, credits etc. Meta segment 804 acts as an informative display, or commercial like display, or the company logo animated in some way etc. Meta segment 805 plays prior to the next video segment and will relate to that particular video segment via PVPD such as providing a title, description and thumbnail of the video segment that will play next. Video segment 806 is next to be played in the seamless broadcast. The video segment 806 may also have its own motion graphics as described within VSML. The T value 807 is the duration at which meta segment 801 is influenced by the buffering time T as described in the buffering algorithm to determine the value of T. The SBT value 808 is the duration at which all other meta segments factor in there play duration as influenced by the buffering time SBT as described in the buffering algorithm to determine the value of SBT.

Figure 13:
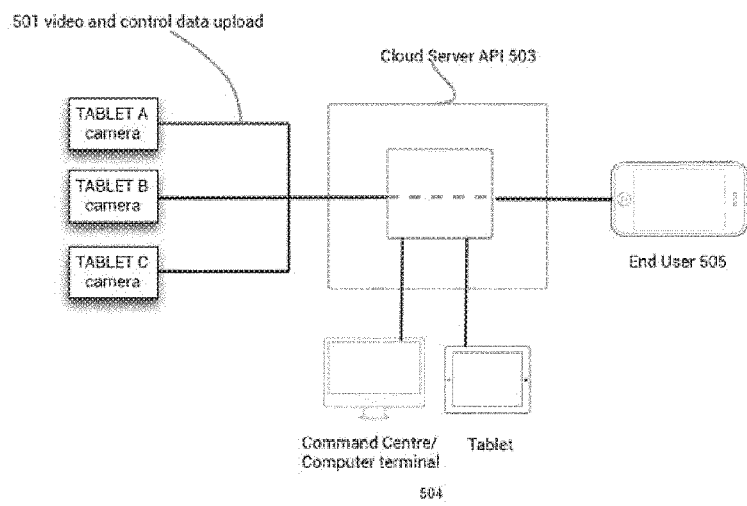
FIG. 13 is a diagrammatic illustration of an embodiment which facilitates live editing of content.

Referring now to FIG. 13 there is illustrated an exemplary broadcast system which facilitates live stream edit decisions using a cloud application programming interface (API). In this example, three smart devices, namely, tablet A, tablet B and tablet C upload video and control data to a cloud server. The live broadcast Application (LB A) is a thin client program which applies the necessary functions to edit and apply VSML effects to a cloud server API as its being broadcast to the end user 505. The LBA allows for the use of multiple mobile smart devices to be connected from any location, example different countries or used in one location for example smart device camera set-up with a medium, close and wide angle shooting arrangement. Using the thin client program LBA which works in combination with the cloud server API, it allows Secure Broadcasts application to apply VSML effects as real-time layered compositing to achieve a live version of this in the context of an edited multi stream feed from different devices into a single layered edited broadcast which provides the necessary control and video data that adds and recreates the layers and specified effects locally on every device authorised to view it. This is achieved with two versions of LBA: remote directing on a cloud based editing live broadcast, with real-time motion graphics. Local based directing and live broadcast with real-time motion graphics.

The mechanism for both ways are the very similar however, the first version is done as it is being uploaded via the Internet. The second version occurs by uploading from the local ad hoc (or intranet) network prior to uploading to the Cloud Network API.

At step 501, smart device A, smart device B and smart device C, each of these devices are filming from a different angle of say a lecture for example that is to be broadcast live with applied VSML effects to end users of the platform. Each smart device A, B and C and any additional feeds are uploading a video stream and control data as it is being seen by the thin client Live Broadcast Application (LBA) 504 on its way to the end user 505. Another user would be directing the edits and authorising or adding layers using the (LBA) whether by a computer terminal or Smart device 504, a edit decision is made between smart device A, B, C by choosing which shooting angle from either smart device A, B or C at a particular moment gets chosen to be broadcast to the final user. The VSML applied effects are either added by the device 504 as it happens, and/or set up prior to broadcasts commencing by creating the live broadcast project or if an individual has added their own VSML applied effects from either uploading smart device 501.

In the example of FIG. 13, the smart device footage from A, B, C will be uploaded via the internet to Cloud server 503 and seen by the (LBA) 504 which accesses the cloud server 503. The director/authoriser of the broadcast who could be anywhere in the world, will choose which feed to broadcast as it happens, (there will be no download from director to make edit decisions and no upload from the director for final broadcast) due to the nature of being a thin client it will be a choice of which of the uploading live feeds gets chosen for final broadcast as it happens and what VSML applied effects are added.

Figure 14:
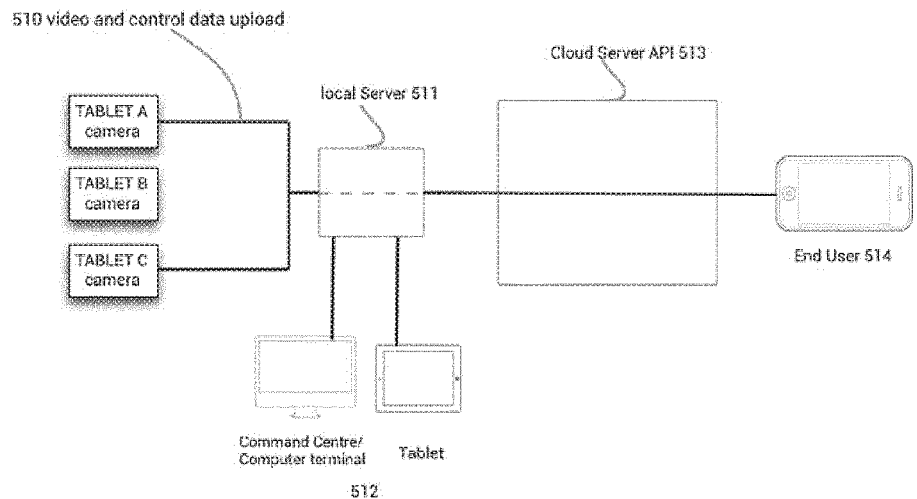
FIG. 14 is a diagrammatic illustration of an embodiment which facilitates local live editing of content.

In the example of FIG. 14 the broadcast system provides local-live editing with real-time live stream layering where local based editing and the application of specified VSML applied effects occur using real-time layered compositing multilayer player, the Smart Device A,B,C 510, the upload feeds, along with any control data that has been added from the device level, will be uploaded via the intranet (or ad hoc network) locally to local server 511 and seen by the Local Live Broadcast Application (LLBA) 512, the director of the broadcast who would be in the locality of the event and under the same local ad hoc (or intranet) network and will choose which feed to broadcast as it happens, it will be a choice of which of the uploading feeds get chosen for final broadcast as it happens and what specified VSML applied effects are applied using our real-time layered compositing multi-layer composites. The edit decision and VSML effects 512 will only be uploading one feed of video data and control data for broadcasting to the cloud network server 513.

Figure 15:
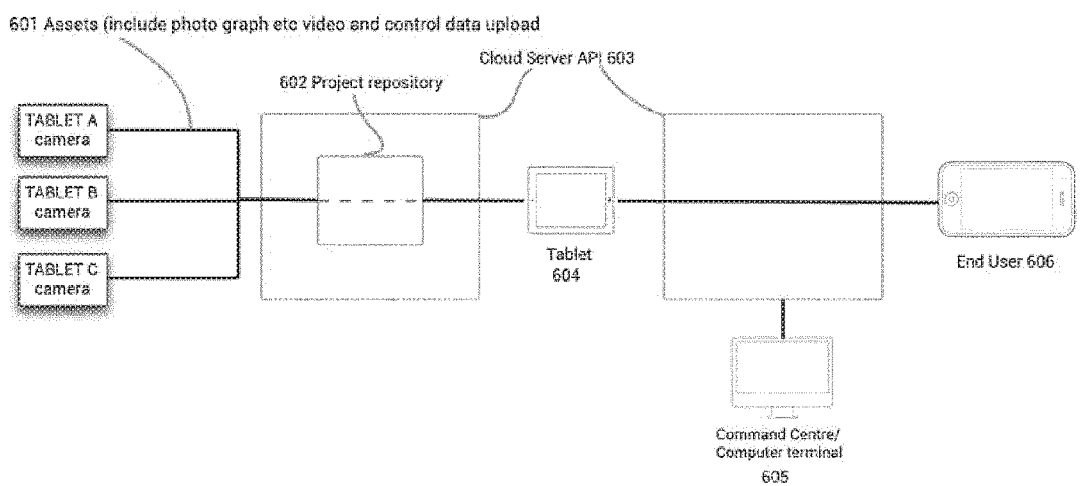
FIG. 15 is a diagrammatic illustration of an embodiment which facilitates broadcasting from multiple sources.

Referring now to FIG. 15 which illustrates a broadcast system where by multiple users with different operating systems (IOS, ANDROID, .NET etc) can add their captured footage and send it into a project that has not been submitted for approval yet, users could be sending footage from anywhere in the world, it allows another users to use that footage to create a broadcast.

The users can use their phone (cross platform) to record footage and send it to their tablet/or a specific users Tablet/or to their Tablet. They can then login edit away as normal. The video broadcast system can create a open project where any authorised user 601 using any popular operating system whether a phone or tablet can submit footage they have on their smart device/phone to the Project administrators smart device 604 for the purpose of gathering footage to be used as a single broadcast with VSML applied effects created by Real-Time layered compositing multi-layer player. The video project would have a required brief listing the shots and locations clearly stated/needed to fulfill the video brief, or any other multimedia content (picture, Graphic etc) Example, a Mountain, or a building, interview, picture, logo etc. A user 601 would see this project and accept to capture one or more from the list in whatever location they are in. Once captured the authorised user 601 would submit the footage/asset to the project repository 602 in the cloud server API 603. The footage would then be downloaded to the administrators open project within their smart device 604. Once all footage has been gathered the Open project status, becomes closed and the administrator can finish the video project and apply the necessary VSML applied effects. The Administrator would then once completed submit the project to the command centre 605 for approval as previously described, via the cloud server API 603, where on approval would be available to all authorised end users 606. This solves two major issues:

1: not everyone needs a tablet to capture footage
2: Cross platform compatibility.

The advantages of this teaching are many. The footage may come from anywhere with various filming angles of the same event/project brief coming to a central point (tablet) from any location. Project based capture, can make part of the phone UI having the ability to select a predetermined video brief, the shots and locations clearly stated/needed to fulfill the video brief, and when the individual clicks into that project any video they capture and submit will load into that project (BIN) and can then be used to create that video.

Figure 16:
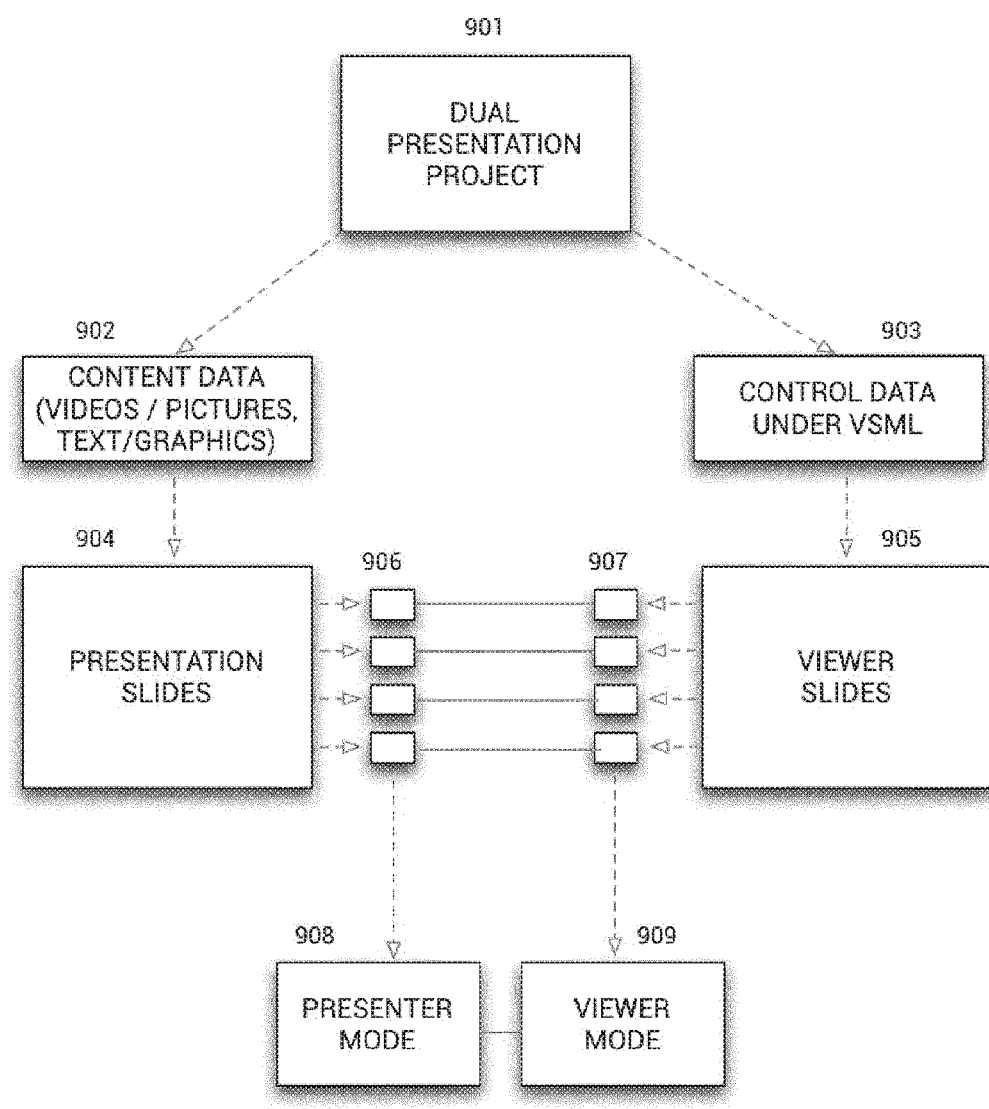
FIG. 16 is a diagrammatic illustration of an embodiment which facilitates dual presentations.

Referring now to FIG. 16, a dual presentation system is described. As the network is based on control data the technology allows for the control data (metadata) to be shown in useful ways. Using the tablet users can create a slide/multimedia presentation. The system allows for the information to be presented in two ways.

1. Presenter Mode
2. Viewer Mode

When giving a presentation to an audience the presenter within the platform using the tablet would present his/her presentation in the Presenter mode. The viewers who have their own tablet within the platform could select the viewer mode. This will present affiliated information that is associated with each particular slide, additional information. The affiliated information would be a combination of the existing control data but is also will provide ways that each user can input information themselves which becomes part of the existing metadata for the system, it could be as simple as notes of the slide, comments, ideas etc. Each comment, remark made will then be available for all to see instantly. When under the presenter mode the viewer mode becomes the slave of the presenter mode, when the presenter moves onto a new slide the viewer mode moves also.

At block 901, an authorised user wishing to create a presentation would open a Dual presentation project. Which allows them to create two branches of the slides it will either be a presenter slide or a Viewer slide. At block 902 user selects which assets to use for the presentation under Presenter Mode. At block 903 user has access to control data fields, that will be used to create slides as seen within viewer mode. At block 904 user begins the process of creating presenter content slides 906, each new slide automatically creates a dual slide as seen in viewer mode. At block 905 user begins the process of creating viewer content slides 907, the user will input meta data for every presenter slide created both the presenter slide and the viewer slide are now linked. This data will be displayed by the media player as described by VSML to display this data in interesting ways. Example a comments feed that a viewer can share notes to all viewing in real time, it could be additional descriptions of the content displayed by the presenter slides, additional resources or links to other videos and content within/or out side the the Secure Broadcast network.

At block 908, presenter mode is the display given by the presenter to their audience, it will show what has been created by each slide, whether a video, picture, graphics etc all run by the media player under instruction as described by VSML. The presenter mode is linked to the corresponding viewer slide. If the presenter move to the next presenter slide the view mode will automatically move to the corresponding viewer slide.

At block 909 user who are watching the presentation can choose which mode to view the presentation if in Presenter mode will see as presented by presenter, if in viewer mode the linked viewer slides will be seen as created within the viewer slides 907. The media player would in real-time create the real-time layered composites as has been previously claimed by the methods also described in VSML. There are features which allow a user to finish their comments etc. and still remain in sync with the presenter slide numbers. The ability to write on the VSML applied effects and that input data can be used as a method to communicate that writing content to other authorised users. The ability for that written content to be used as a search parameter. The ability to add markers along a video where users can jump to different marker points along a video stream and start watching it from the point onwards.

Figure 17:
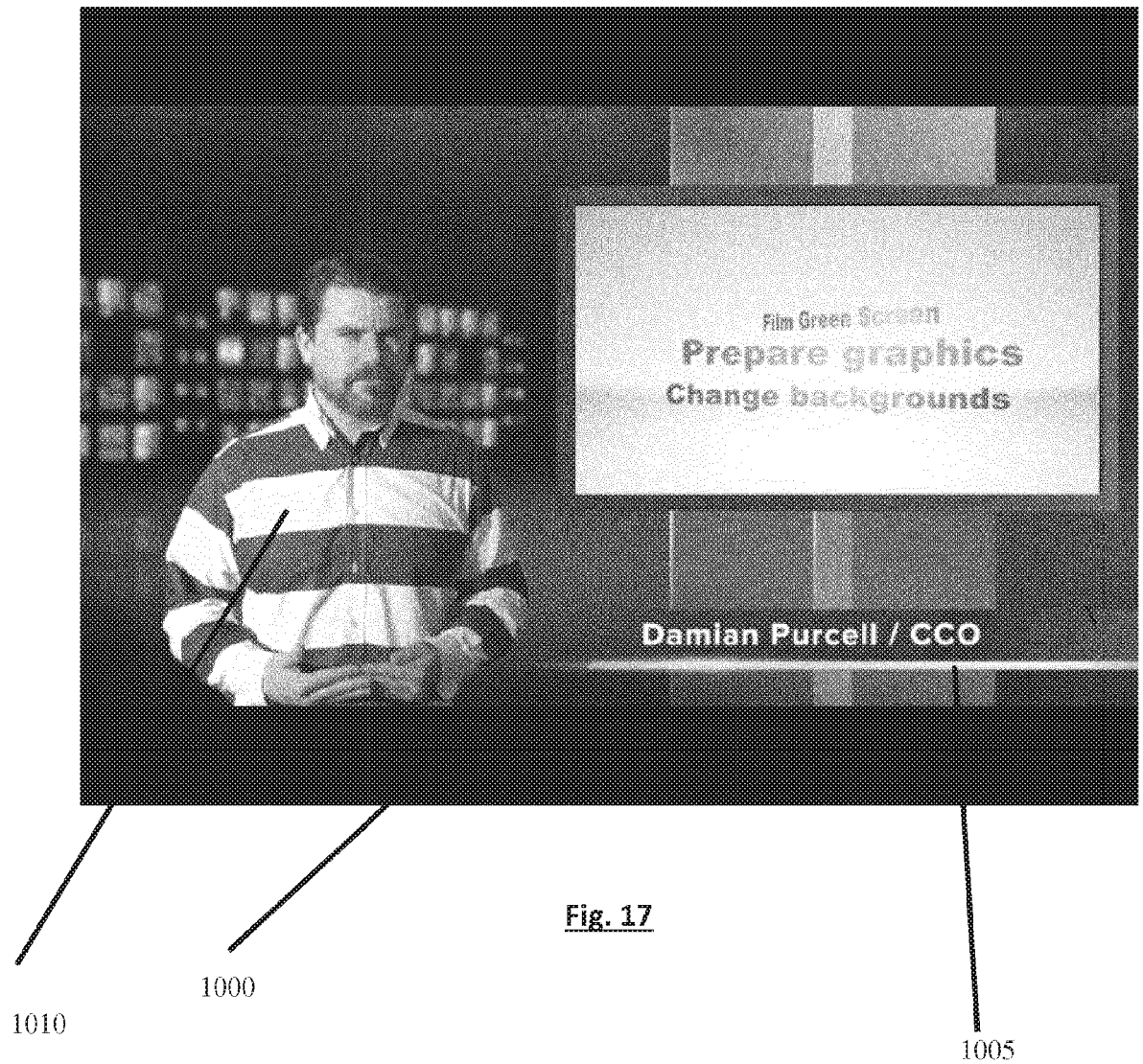
FIG. 17 is a screen shot illustrating an exemplary display output from the media player.

Referring now to FIG. 17 which is an exemplary screen shot 1000 of the visual display unit of the tablet 25 of FIG. 1. The screen shot is a visual representation of the output from the media player 126. It will be appreciated by those skilled in the art that video data is captured on the first device 15. Control data (markup-language) is associated with the video data on the first device 15 by a user of the first device. The control data contains information for creating auxiliary data, in this case, a background template. The video data and control data are broadcast to one or more second devices 25 across the network 30. The media player 126 on the respective second devices 25 is operable in response to reading the control data to create the background template 1005 locally on the respective second devices. The background template 1005 and the video data 1010 give the appearance of a single integrated entity when displayed on the second device 25. The background template 1005 includes an area where the downloaded video stream 1010 is inserted. The streamed video data 1010 in this example is an insert of a person. The background template 1005 is created locally on the tablet 25 as result of the media player 126 translating the markup language into a visual representation. The template 1005 occupies the majority of the visual display unit while the video data 1010 occupies only a relatively small portion of the visual display unit. The template 1005 is generated locally to have high definition (HD) resolution. The resolution of the video data 1010 is standard definition (SD). However, since the video data 1010 only occupies a very small area of the overall screen the overall visual impression is that the output from the media player 126 is of a high definition quality.

It will be understood that what has been described herein is an exemplary system for distributing video content. While the present teaching has been described with reference to exemplary arrangements it will be understood that it is not intended to limit the teaching to such arrangements as modifications can be made without departing from the spirit and scope of the present teaching.

It will be understood that while exemplary features of a distributed network system in accordance with the present teaching have been described that such an arrangement is not to be construed as limiting the invention to such features. The method of the present teaching may be implemented in software, firmware, hardware, or a combination thereof. In one mode, the method is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. The steps of the method may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the first, second, third and fourth modules as described above. The processor(s) is a hardware device for executing software, particularly software stored in memory. Processor(s) can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions.

Memory is associated with processor(s) and can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present teaching may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Json and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch process the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. Any process descriptions or blocks in the Figures, should be understood as representing modules, segments, or portions of code which include one or more executable instructions for implementing specific logical functions or steps in the process, as would be understood by those having ordinary skill in the art.

It should be emphasized that the above-described embodiments of the present teaching, particularly, any "preferred" embodiments, are possible examples of implementations, merely set forth for a clear understanding of the principles. Many variations and modifications may be made to the above-described embodiment(s) without substantially departing from the spirit and principles of the present teaching. All such modifications are intended to be included herein within the scope of this disclosure and the present invention and protected by the following claims.

The advantages of the present teaching are many. The current method maintains high quality graphics, text and special effects resolution at all times, whereas the quality of existing video broadcast system's graphics, text and special effects resolution is variable in direct correlation to the size of the data being broadcast, with a lower data size reducing the quality of the graphics, text and special effects resolution. However, a reduction of the data size in the current method will reduce the video data's resolution only without reducing at the same time the quality of the graphics, text and special effects, these being created or stored locally on a user's smart device in a high resolution.

As the current method stores and transmits only the video data and control data, and then applies graphics, text and special effects from a locally stored database on a user's smart device, the data size for transmission and the resulting upload/download speeds under varying network/internet speeds is improved in comparison to existing video broadcast systems. Existing video broadcast systems wanting equivalent graphic, text and special effects will require storing and transmitting a larger rendered single flattened video structure containing the graphics, text and special effects, thus taking a greater time for upload/download and a larger data size for transmission. The current method can reduce the overall size for storage and transmission by reducing only the video data size without effecting the graphics, text and special effects; however existing video broadcast systems must, in order to maintain high quality graphics, text and special effects, maintain a larger file size for storage and transmission to equal the graphics, text and special effects applied to the video data using the current method.

The costs associated with viewing the content, in both monetary terms and man hours, using the current method is improved in comparison with that of the methods employed in existing video broadcast systems. As only the video data and control data are being stored and transmitted through the network in the current method, the speed and costs of producing and broadcasting video with high quality graphics, text and special effects is minimized in comparison with the traditional methods employed in existing video broadcast systems. The traditional methods require a significantly larger data size in order to maintain comparable high quality graphics, text and special effects, thereby increasing the costs associated with transmission, storage and viewing.

It will be appreciated that the control data may comprise a plurality of control parameters which represent corresponding effects. One or more of the control pararmeters may be selectable on the first device. The selected one or more control parameters on the first device may be associated with the video data such that the one or more control parameters may be applied by the media player as it is being played on the respective second devices.

While the present teaching has been described with reference to exemplary applications and modules it will be understood that it is not intended to limit the teaching of the present teaching to such arrangements as modifications can be made without departing from the spirit and scope of the present invention. It will be appreciated that the system may be implemented using cloud or local server architecture. In this way it will be understood that the present teaching is to be limited only insofar as is deemed necessary in the light of the appended claims.

Similarly the words comprises/comprising when used in the specification are used to specify the presence of stated features, integers, steps or components but do not preclude the presence or addition of one or more additional features, integers, steps, components or groups thereof.

The invention claimed is:

1. A method for distributing video content across a network; the method comprising:
providing video data on a first device,
associating control data with the video data on the first device; wherein the control data contains information for creating auxiliary data,
broadcasting the video data and control data to one or more second devices across the network,
providing a media player on the respective second devices which is operable in response to reading the control data to create the auxiliary data locally on the respective second devices, and
launching the auxiliary data while the media player is playing the video data; wherein the resolution of the displayed video data is dependent on available network bandwidth of the respective second devices while the resolution of the auxiliary data is independent of the available network bandwidth as it is recreated post broadcasting on the respective second devices such that the displayed video data and the auxiliary data have different resolutions.

2. A method as claimed in claim 1, wherein the media player performs a calculation to determine buffering time required for the video data to be downloaded to the respective second devices.

3. A method as claimed in claim 2, wherein the period for displaying two or more display segments are varied in response to the calculated buffering time.

4. A method as claimed in claim 1, wherein the media player on the respective second devices is operable in response to reading the control data to initiate a fetch process for retrieving data from a local or remote location.

5. A method as claimed in claim 4, wherein a first database is provided on the first device for storing the control data.

6. A method as claimed in claim 5, wherein a second database is provided on the respective second device for storing data elements which are referenced in the control data.

7. A method as claimed in claim 1, wherein the control data includes instructions for applying at least one specified effect, a graphic, text data, a special effect, or audio data to the video data when the video data is being played on the media player on the respective second devices.

8. A method as claimed in claim 1, wherein a first user interface is provided on the first device for facilitating a user selecting the control data to be associated with the video data.

9. A method as claimed in claim 1, wherein the control data associated with the video data is synchronised with the video data on the first device.

10. A method as claimed in claim 1, wherein a data structure is generated on the first device containing the video data and the associated control data.

11. A method as claimed in claim 10, wherein the first device is configured to transmit the data structure to a control centre.

12. A method as claimed in claim 11, wherein the control centre is configured for communicating the data structure to the one or more second devices.

13. A method as claimed in claim 11, wherein the control centre is operable for modifying the control data associated with the video data.

14. A method as claimed in claim 13, wherein the control centre is operable to approve or disapprove the video data in advance of broadcasting.

15. A method as claimed in claim 11, wherein a remote device is in communication with the control centre for facilitating remote approval of the video data and associated control data.

16. A method as claimed in claim 1, wherein a template is provided on the first device for facilitating the placing of a video subject within a template.

17. A method as claimed in claim 16, wherein the template contains a designated minimal resolution area where the video data is to be inserted.

18. A method as claimed in claim 1, wherein the network bandwidth of the respective second devices are monitored such that a video resolution is selected for broadcasting based upon the available network bandwidth.

19. A system for distributing video content; the system comprising:
a first device having video data provided thereon,
a first application operable on the first device and being configured for associating control data with the video data, wherein the control data contains information for creating auxiliary data which is to be presented with the video data subsequent to the video data being broadcast to one or more second devices across the network;

a control centre in communication with the first application for receiving the video data and the associated control data from the first device, the control centre being operable to broadcast the video data and the associated control data to one or more second devices, and a media player being provided on the respective second devices which is operable in response to reading the control data to create the auxiliary data on the respective second device; the media player being operable to launch the auxiliary data while the media player is playing the video data, wherein the resolution of the displayed video data is dependent on available network bandwidth of the respective second devices while the resolution of the auxiliary data is independent of the available network bandwidth as it is recreated post broadcasting on the respective second devices such that the displayed video data and the auxiliary data have different resolutions due to network bandwidth.

20. A non-transitory computer readable medium comprising a data carrier having encoded thereon machine readable instructions which, when executed in a computerised system implements a method for distributing video content across a network; the method comprising:

providing video data on a first device,
associating control data with the video data on the first device; wherein the control data contains information for creating auxiliary data,
broadcasting the video data and control data to one or more second devices across the network,
providing a media player on the respective second devices which is operable in response to reading the control data to create the auxiliary data locally on the respective second devices, and
launching the auxiliary data while the media player is playing the video data; wherein the resolution of the displayed video data is dependent on available network bandwidth of the respective second devices while the resolution of the auxiliary data is independent of the available network bandwidth as it is recreated post broadcasting on the respective second devices such that the displayed video data and the auxiliary data have different resolutions.

21. A method for distributing video content across a distributed network; the method comprising
providing video data on a first device,
associating control data with the video data on the first device for specifying effects to be applied to the video data subsequent to the video data being broadcast to one or more second devices across the network,
providing a media player on the respective second devices which is operable in response to reading the control data to fetch specified effects from a local database on the respective second devices and apply the fetched specified effects as the video data is played by the media player,
wherein the resolution of the displayed video data is dependent on available network bandwidth of the respective second devices while the resolution of the auxiliary data is independent of the available network bandwidth as it is recreated post broadcasting on the respective second devices such that the displayed video data and the auxiliary data have different resolutions.

22. A system for distributing video content; the system comprising:

a first device having video data provided thereon,
a first application operable on the first device and being configured for associating control data with the video data,
a control centre in communication with the first application for receiving the video data and the associated control data from the first device, the control centre being operable to broadcast the video data and the associated control data to one or more second devices, and
a media player being provided on the respective second devices which is operable in response to reading the control data to fetch specified effects from a local database on the respective second devices and apply the fetched specified effects as the video data is played by the media player,
wherein the resolution of the displayed video data is dependent on available network bandwidth of the respective second devices while the resolution of the auxiliary data is independent of the available network bandwidth as it is recreated post broadcasting on the respective second devices such that the displayed video data and the auxiliary data have different resolutions.

* * * * *